United States Patent
Wu et al.

(10) Patent No.: US 12,442,996 B2
(45) Date of Patent: Oct. 14, 2025

(54) SCATTERING LIGHT-BASED MONITOR FOR PHOTONIC INTEGRATED CIRCUIT, MONITORING SYSTEM AND MONITORING METHOD

(71) Applicant: GlobalFoundries U.S. Inc., Malta, NY (US)

(72) Inventors: Zhuojie Wu, Port Chester, NY (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 514 days.

(21) Appl. No.: 17/812,023

(22) Filed: Jul. 12, 2022

(65) Prior Publication Data

US 2024/0019651 A1    Jan. 18, 2024

(51) Int. Cl.
     *G02B 6/42*          (2006.01)
     *G02B 6/122*        (2006.01)
     (Continued)

(52) U.S. Cl.
     CPC ......... *G02B 6/4286* (2013.01); *G02B 6/1228* (2013.01); *H04B 10/07955* (2013.01);
     (Continued)

(58) Field of Classification Search
     CPC ............... G02B 6/4286; G02B 6/1228; G02B 2006/12061; G02B 2006/12147; H04B 210/07955

See application file for complete search history.

(56) References Cited

U.S. PATENT DOCUMENTS 5,164,930 A * 11/1992 Sugiura ............... H01S 5/02326
                                                369/112.14
6,163,632 A * 12/2000 Rickman ............. G01C 19/728
                                                     385/12

(Continued)

FOREIGN PATENT DOCUMENTS

EP          3244242 A1     11/2017
EP          3244242 B1 *   5/2022         G02B 6/12004

(Continued)

OTHER PUBLICATIONS

Aboketaf et al., "Towards fully automated testing and characterization for photonic compact modeling on 300-mm wafer platform," Optical Fiber Communication Conference (OFC) 2021, OSA Technical Digest, 3 pages.

(Continued)

*Primary Examiner* — Peter Radkowski
(74) *Attorney, Agent, or Firm* — Jessie Cheah; Hoffman Warnick LLC

(57) ABSTRACT

Disclosed is a photonic integrated circuit (PIC) structure including a scattering light-based monitor with photodetectors (e.g., PIN and/or avalanche photodiodes) placed adjacent to one or both sides of an end portion (i.e., a coupler) of a waveguide core at an optical interface with another optical device. The photodetectors are placed in such a way as to enable sensing of scattering light emitted from the end portion as light signals are received (e.g., either from the optical device for propagation to the main body of the waveguide core or from the main body for transmission to the optical device). Also disclosed are a monitoring system and method including the PIC chip structure with the above-described scattering light-based monitor. The system and method assess the optical interface using electric signals generated by the photodetectors.

10 Claims, 17 Drawing Sheets

(51) Int. Cl.
*H04B 10/079* (2013.01)
*G02B 6/12* (2006.01)

(52) U.S. Cl.
CPC .............. *G02B 2006/12061* (2013.01); *G02B 2006/12147* (2013.01)

(56) References Cited

U.S. PATENT DOCUMENTS

| | | | |
|---|---|---|---|
| 6,243,517 B1* | 6/2001 | Deacon | G02B 6/42 385/24 |
| 6,920,257 B1* | 7/2005 | Mekis | G02B 6/122 385/39 |
| 6,987,913 B2* | 1/2006 | Blauvelt | G02B 6/423 385/39 |
| 7,050,681 B2* | 5/2006 | Blauvelt | G02B 6/30 385/39 |
| 7,146,073 B2* | 12/2006 | Wan | B23K 26/707 385/27 |
| 7,155,133 B2* | 12/2006 | Stewart | H04B 10/6931 250/214 R |
| 7,158,702 B2* | 1/2007 | Blauvelt | G02B 6/12002 385/39 |
| 7,162,113 B2* | 1/2007 | Welch | H04J 14/02 398/91 |
| 7,164,825 B2* | 1/2007 | Blauvelt | G02B 6/2804 385/39 |
| 7,217,914 B2* | 5/2007 | Stewart | H04B 10/6911 250/214 R |
| 7,379,638 B2* | 5/2008 | Blauvelt | G02B 6/30 385/14 |
| 7,519,246 B2* | 4/2009 | Welch | G02B 6/131 398/91 |
| 7,526,150 B2* | 4/2009 | Welch | G02B 6/12004 398/91 |
| 7,539,365 B2* | 5/2009 | Welch | G02B 6/12026 398/91 |
| 7,570,845 B2* | 8/2009 | Welch | G02B 6/12026 398/91 |
| 7,577,327 B2* | 8/2009 | Blauvelt | G02B 6/12002 385/27 |
| 7,672,546 B2* | 3/2010 | Welch | H01S 5/026 398/91 |
| 7,680,368 B2* | 3/2010 | Welch | G02B 6/131 398/91 |
| 7,773,837 B2* | 8/2010 | Welch | G02B 6/12019 385/14 |
| 7,783,146 B2* | 8/2010 | Blauvelt | G02B 6/12002 385/50 |
| 7,853,103 B2* | 12/2010 | Blauvelt | G02B 6/30 385/27 |
| 7,885,499 B2* | 2/2011 | Blauvelt | G02B 6/2804 385/50 |
| 8,855,447 B2* | 10/2014 | Dekker | A61B 5/489 385/1 |
| 8,867,872 B2* | 10/2014 | Sercel | G02B 6/4286 385/129 |
| 8,873,901 B2* | 10/2014 | Kang | G02B 6/124 385/14 |
| 8,934,741 B2* | 1/2015 | Chen | G02F 1/3615 385/14 |
| 9,025,911 B2* | 5/2015 | Dekker | G03B 21/2033 385/1 |
| 9,048,371 B2* | 6/2015 | Ang | H10F 77/413 |
| 9,389,378 B2* | 7/2016 | Mack | G02B 6/4214 |
| 9,426,435 B2* | 8/2016 | Dekker | G02B 6/12007 |
| 9,479,281 B2* | 10/2016 | Nagarajan | H04B 10/801 |
| 9,557,484 B1* | 1/2017 | Norberg | G02B 6/1228 |
| 9,703,128 B2* | 7/2017 | Chen | G02F 1/065 |
| 9,746,626 B2* | 8/2017 | Mack | G02B 6/4214 |
| 10,284,323 B2* | 5/2019 | Salsi | H04J 14/0202 |
| 10,551,624 B2* | 2/2020 | Rothberg | G02B 27/0927 |
| 10,910,503 B1* | 2/2021 | Bian | G02B 6/13 |
| 11,249,318 B2* | 2/2022 | Rothberg | G02B 19/0061 |
| 11,320,267 B2* | 5/2022 | Wang | G01B 9/02 |
| 11,353,655 B2* | 6/2022 | Wang | G02B 6/126 |
| 11,415,419 B2* | 8/2022 | Wang | G01C 19/721 |
| 12,136,681 B2* | 11/2024 | Wang | G01C 19/58 |
| 2002/0110328 A1* | 8/2002 | Bischel | G02B 6/4201 385/27 |
| 2002/0149780 A1* | 10/2002 | Trinh | G01J 9/0246 356/477 |
| 2003/0081902 A1* | 5/2003 | Blauvelt | G02B 6/1228 385/39 |
| 2003/0095737 A1* | 5/2003 | Welch | H04J 14/0276 385/14 |
| 2003/0210917 A1* | 11/2003 | Stewart | H04B 10/6931 398/209 |
| 2004/0096175 A1* | 5/2004 | Tolstikhin | H01L 31/105 385/14 |
| 2005/0001152 A1* | 1/2005 | Stewart | H04B 10/6911 250/214 R |
| 2005/0006567 A1* | 1/2005 | Stewart | H04B 10/6911 250/214 R |
| 2005/0213889 A1* | 9/2005 | Blauvelt | G02B 6/12007 385/39 |
| 2006/0013532 A1* | 1/2006 | Wan | B23K 26/707 385/12 |
| 2006/0093362 A1* | 5/2006 | Welch | G02B 6/12019 398/87 |
| 2006/0120669 A1* | 6/2006 | Blauvelt | G02B 6/12007 385/50 |
| 2006/0127011 A1* | 6/2006 | Blauvelt | G02B 6/42 385/50 |
| 2007/0110369 A1* | 5/2007 | Blauvelt | G02B 6/4204 385/39 |
| 2007/0127864 A1* | 6/2007 | Welch | G02B 6/12026 385/37 |
| 2007/0201785 A1* | 8/2007 | Welch | G02B 6/12026 385/9 |
| 2007/0211989 A1* | 9/2007 | Blauvelt | G02B 6/125 385/28 |
| 2008/0013881 A1* | 1/2008 | Welch | G02B 6/12004 385/14 |
| 2008/0025726 A1* | 1/2008 | Welch | G02B 6/12033 398/79 |
| 2008/0031626 A1* | 2/2008 | Welch | H01S 5/026 398/79 |
| 2008/0226224 A1* | 9/2008 | Blauvelt | G02B 6/42 385/14 |
| 2009/0022452 A1* | 1/2009 | Welch | G02B 6/12023 385/14 |
| 2009/0022495 A1* | 1/2009 | Welch | G02B 6/12004 398/79 |
| 2010/0024192 A1* | 2/2010 | Blauvelt | G02B 6/2804 29/428 |
| 2010/0314027 A1* | 12/2010 | Blauvelt | G02B 6/42 156/158 |
| 2012/0105812 A1* | 5/2012 | Dekker | H04N 9/3129 353/121 |
| 2012/0163749 A1* | 6/2012 | Huang | G02B 6/12004 385/2 |
| 2012/0314993 A1* | 12/2012 | Kang | G02B 6/124 385/14 |
| 2013/0308897 A1* | 11/2013 | Sercel | G02B 6/4286 385/14 |
| 2014/0375962 A1* | 12/2014 | Dekker | G03B 21/2033 353/31 |
| 2015/0097256 A1* | 4/2015 | Ang | H10F 30/2255 438/69 |
| 2015/0189245 A1* | 7/2015 | Dekker | H04N 9/3129 353/121 |
| 2016/0349547 A1* | 12/2016 | Chen | G02B 6/12004 |
| 2018/0120504 A1* | 5/2018 | Qi | G02B 6/3636 |
| 2018/0164501 A1* | 6/2018 | Norberg | G02B 6/26 |
| 2018/0173000 A1* | 6/2018 | Rothberg | G02B 19/0052 |
| 2020/0124864 A1* | 4/2020 | Rothberg | G02B 27/0911 |
| 2020/0135960 A1* | 4/2020 | Wang | G02B 6/12004 |
| 2021/0057592 A1* | 2/2021 | Bian | G02B 6/13 |

(56) References Cited

U.S. PATENT DOCUMENTS

| | | | | |
|---|---|---|---|---|
| 2021/0356684 A1* | 11/2021 | Wu | ................... | G02B 6/2935 |
| 2022/0128828 A1* | 4/2022 | Rothberg | ................ | G02B 6/34 |
| 2024/0142700 A1* | 5/2024 | Yun | ................... | G02B 6/136 |

FOREIGN PATENT DOCUMENTS

| | | |
|---|---|---|
| JP | S53009129 | 1/1978 |
| WO | 2022018004 A1 | 1/2022 |

OTHER PUBLICATIONS

Bian et al., "3D Integrated Laser Attach Technology on 300-mm Monolithic Silicon Photonics Platform," IEEE Photonics Conference (IPC), 2020, 2 pages.

Bian et al., "Towards low-loss monolithic silicon and nitride photonic building blocks in state-of-the-art 300mm CMOS foundry," Frontiers in Optics/Laser Science OSA Technical Digest (Optica Publishing Group, 2020), 2 pages.

Bian et al., "Monolithically integrated silicon nitride platform," Optical Fiber Communication Conference (OFC) 2021, OSA Technical Digest (Optica Publishing Group, 2020), 3 pages.

Bian et al., "Hybrid III-V laser integration on a monolithic silicon photonic platform," Optical Fiber Communication Conference (OFC) 2021, OSA Technical Digest (Optica Publishing Group, 2021), 3 pages.

Bian et al., "Integrated Laser Attach Technology on a Monolithic Silicon Photonics Platform," 2021 IEEE 71st Electronic Components and Technology Conference (ECTC), pp. 237-244.

Cheng et al., "Grating Couplers on Silicon Photonics: Design Principles, Emerging Trends and Practical Issues," Micromachines 2020, pp. 1-25.

Chowdhury et al., "High Performance Avalanche Photodiode in a Monolithic Silicon Photonics Technology," 2022 Optical Fiber Communications Conference and Exhibition (OFC), 3 pages.

Giewont et al., "300-mm Monolithic Silicon Photonics Foundry Technology," IEEE Journal of Selected Topics in Quantum Electronics, September/Oct. 2019, vol. 25, No. 5., 12 pages.

Marchetti et al. "Coupling strategies for silicon photonics integrated chips." Photonics Research 7.2 (2019), pp. 201-239.

Mu et al. "Edge couplers in silicon photonic integrated circuits: A review." Applied Sciences 10.4 (2020), pp. 1-29.

Ohira et al. "On-chip optical interconnection by using integrated III-V laser diode and photodetector with silicon waveguide." Optics express 18.15 (2010), p. 15440-15447.

Peng et al., "A Cmos Compatible Monolithic Fiber Attach Solution with Reliable Performance and Self-alignment, " in Optical Fiber Communication Conference (OFC) 2020, OSA Technical Digest (Optica Publishing Group, 2020), 3 pages.

Rakowski et al., "45nm CMOS - Silicon Photonics Monolithic Technology (45CLO) for next-generation, low power and high speed optical interconnects," Optical Fiber Communication Conference. Optica Publishing Group, 2020, 3 pages.

Subbaraman et al. "Recent advances in silicon-based passive and active optical interconnects." Optics express 23.3 (2015), pp. 2487-2511.

Mrot et al. "Integrated waveguide PIN photodiodes exploiting lateral Si/Ge/Si heterojunction." Optics Express 25.16 (2017), p. 19487-19496.

European Search Report for corresponding EP Application No. 23178578.3-1020 dated Dec. 8, 2023, 8 pages.

European Search Report for corresponding EP Application No. 23178578.3-1001 dated Jul. 25, 2025, 9 pages.

* cited by examiner

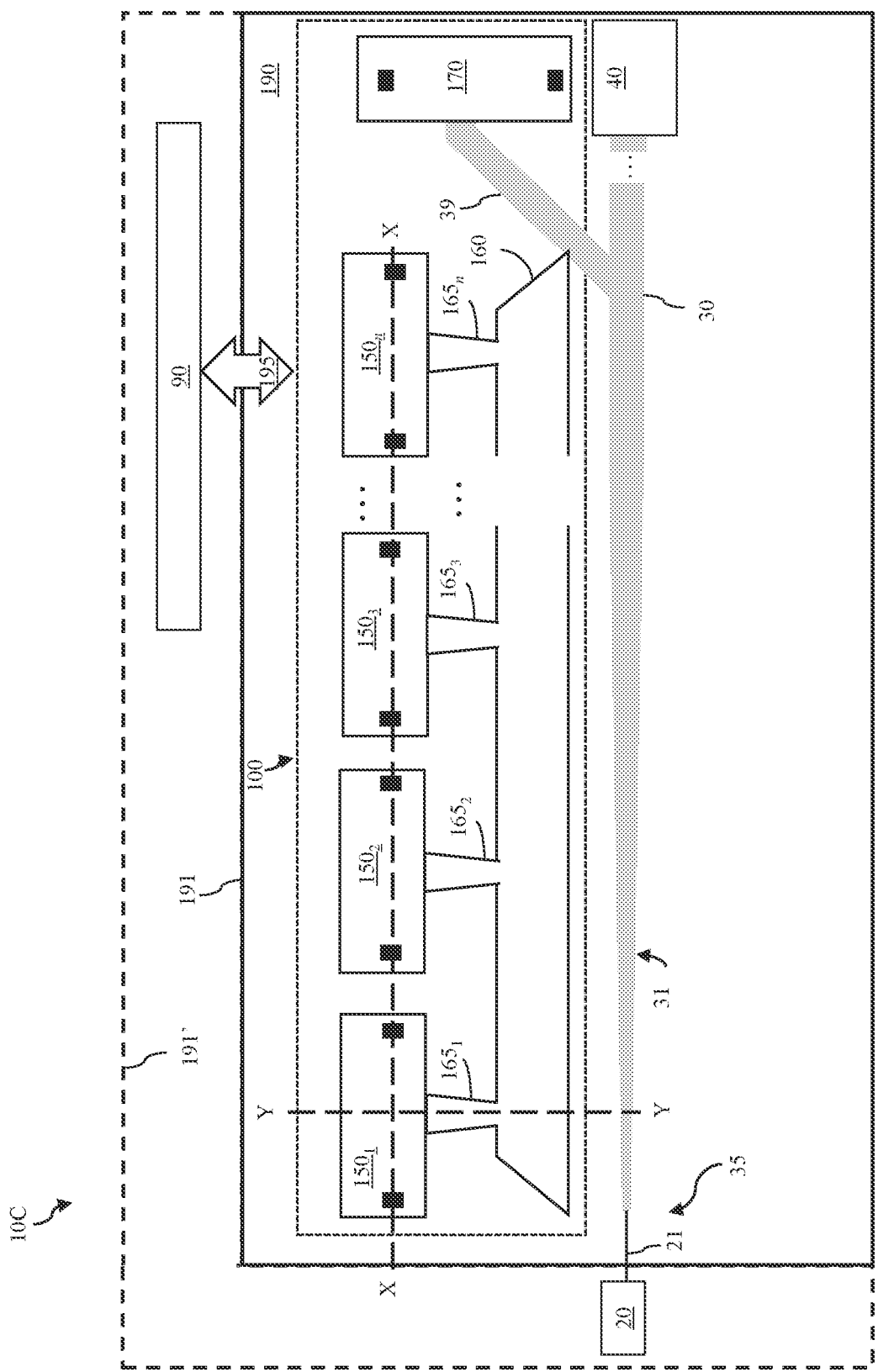

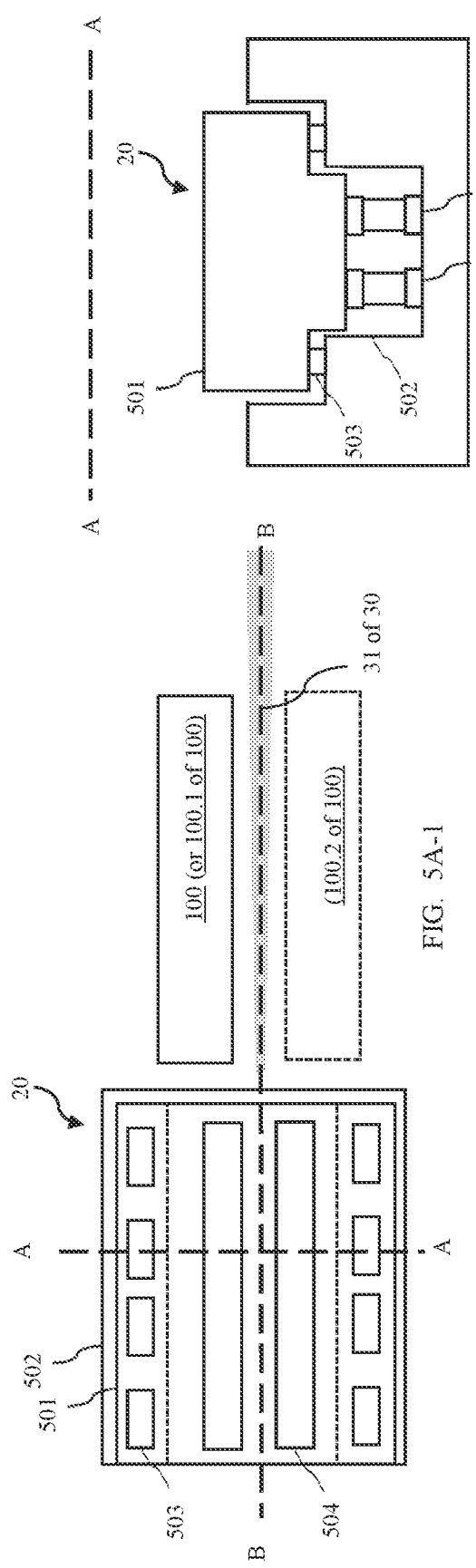
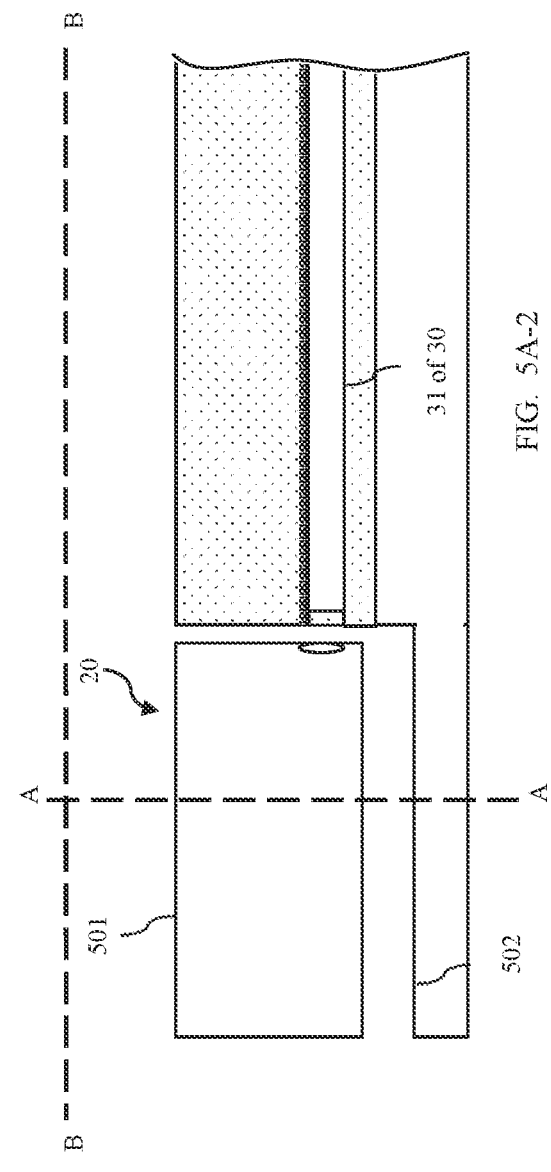
FIG. 5A-1
FIG. 5A-2
FIG. 5A-3

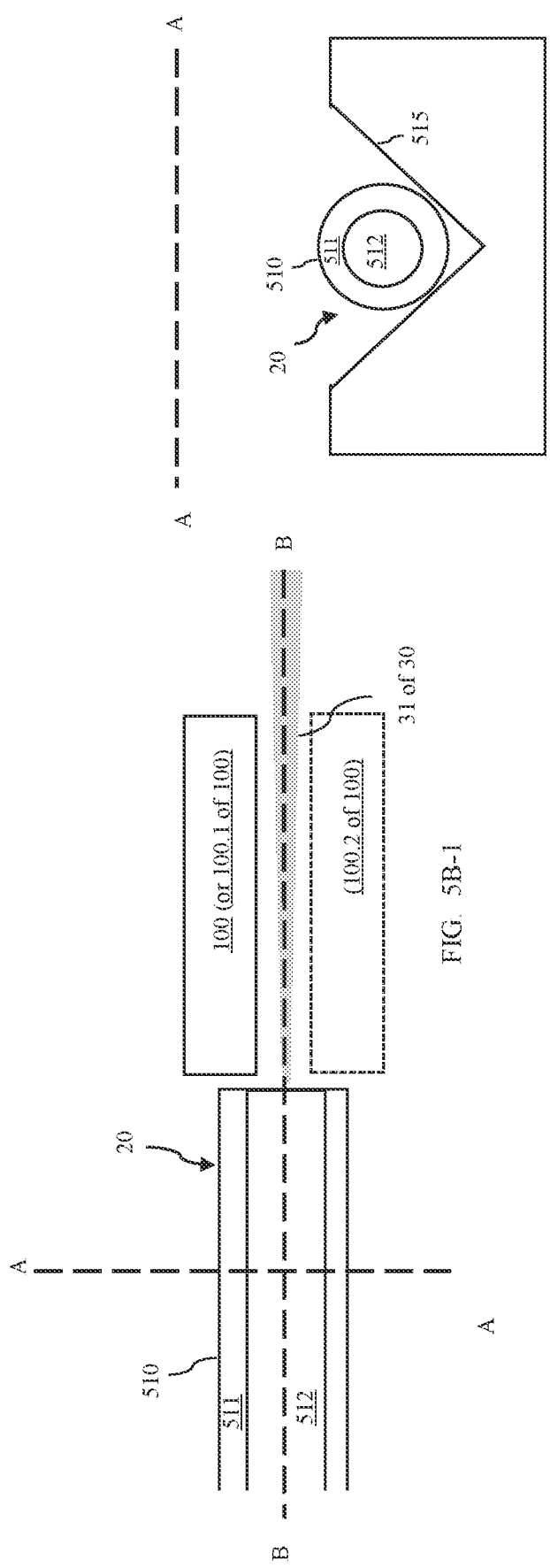
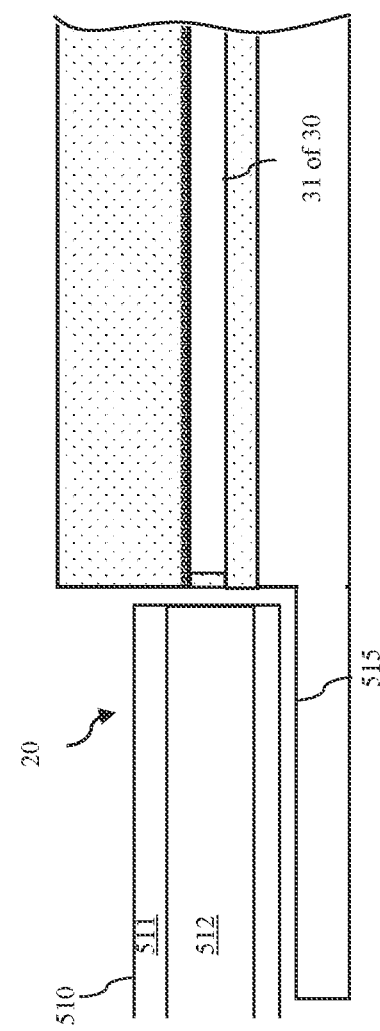
FIG. 5B-1
FIG. 5B-2
FIG. 5B-3

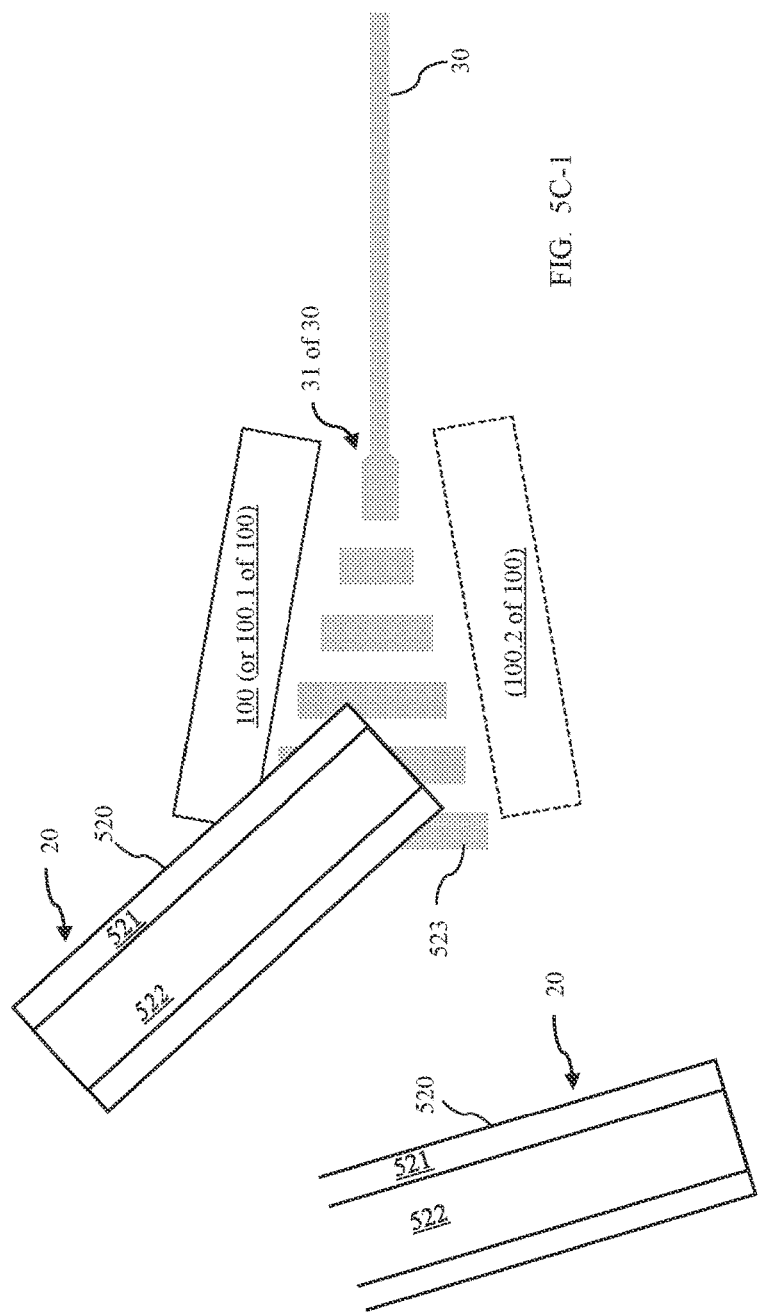
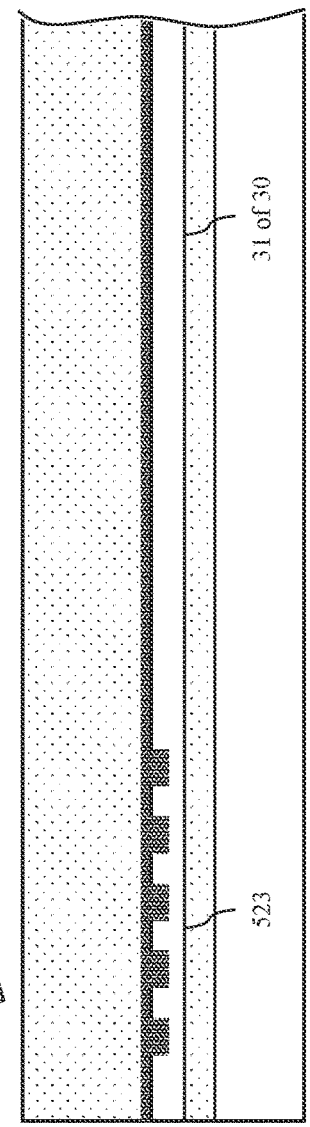
FIG. 5C-1
FIG. 5C-2

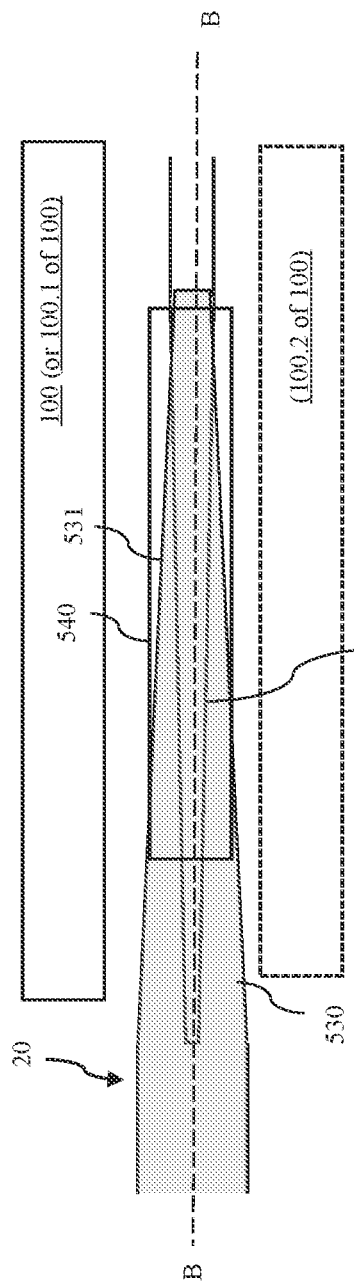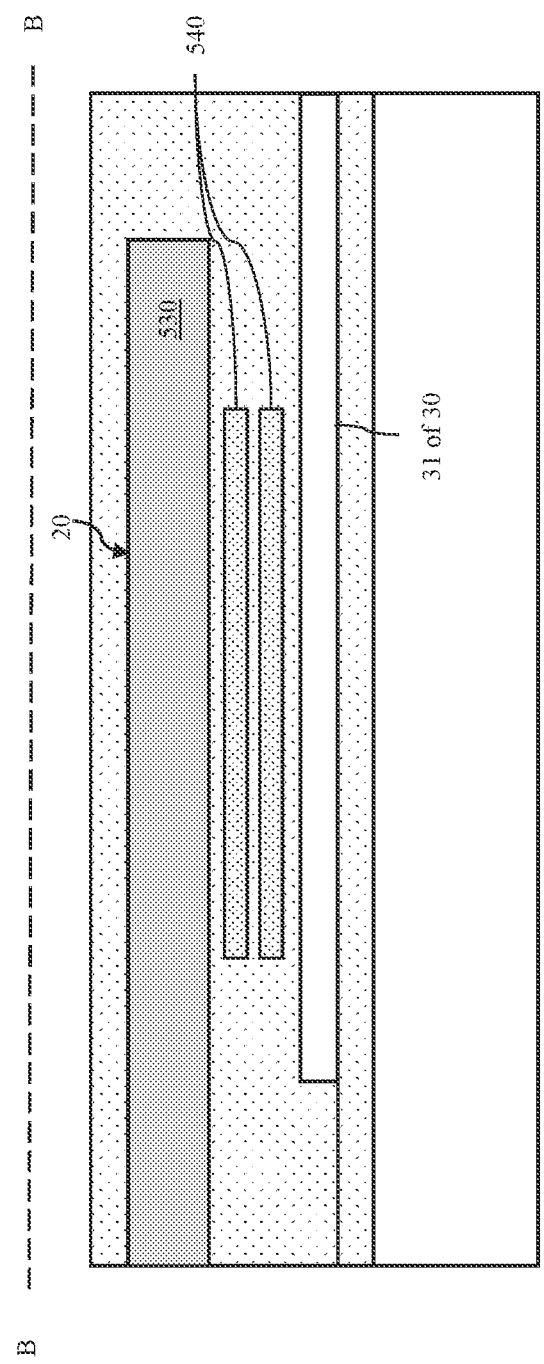
FIG. 5E-1
FIG. 5E-2

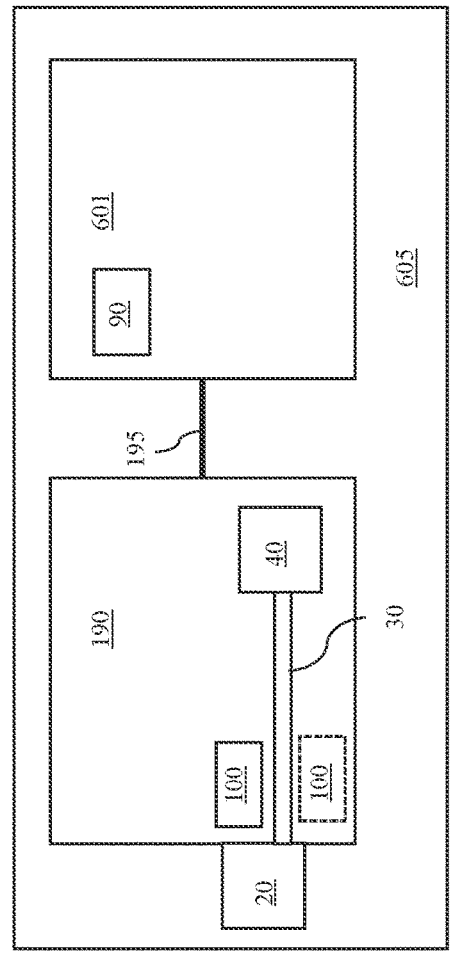
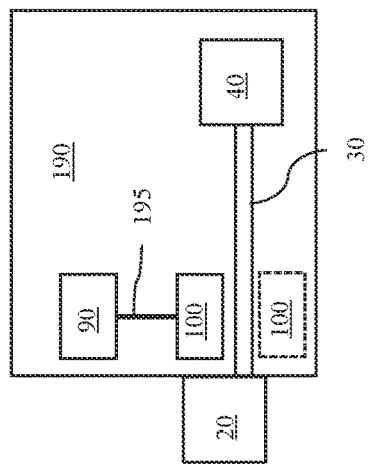
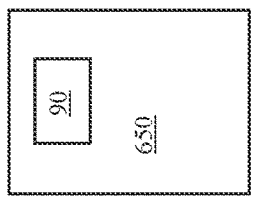
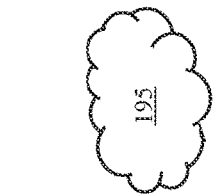
FIG. 6A
FIG. 6B
FIG. 6C

SCATTERING LIGHT-BASED MONITOR FOR PHOTONIC INTEGRATED CIRCUIT, MONITORING SYSTEM AND MONITORING METHOD

BACKGROUND

Field of the Invention

The present disclosure relates to photonic integrated circuits (PICs) and, more particularly, to embodiments of PIC chip structure including a monitor, embodiments of a monitoring system incorporating the PIC chip structure, and embodiments of associated monitoring methods.

Description of Related Art

Optical interfaces, such as off-chip to on-chip optical interfaces or on-chip optical interfaces (e.g., intra-layer or inter-layer optical interfaces), are often weak links in photonic integrated circuit (PIC) systems. Typically, in order to monitor the performance of an optical interface a tap is placed on a downstream waveguide adjacent to the optical interface at issue and this tap is further connected to a photodetector, which monitors the photonic energy of light signals received by the downstream waveguide and propagated therethrough. However, such a tap will consume some percentage (e.g., up to 5% or more) of the optical budget. Additionally, any detected change in the photonic energy could be due to any one of several problems including, for example, a problem with the transmitting light source itself or a problem with the coupling mechanism between the light source and the downstream waveguide.

SUMMARY

In view of the foregoing, disclosed herein are embodiments of a PIC chip structure including a scattering light-based monitor, embodiments of a monitoring system including the PIC chip structure with the scattering light-based monitor, and embodiments of an associated monitoring method. Specifically, disclosed herein are embodiments of a PIC chip structure that includes a scattering light-based monitor. This monitor can include photodetectors (e.g., PIN and/or avalanche photodiodes) placed adjacent to one or both sides of an end portion (i.e., a coupling portion, also referred to herein as a coupler) of a waveguide core. The photodetectors can be physically separated from the end portion (e.g., either by cladding material alone or by a combination of cladding material and a large aperture collector) but, in any case, placed in such a way as to enable sensing of scattering light emitted from the side(s) of the end portion as light signals are received (e.g., either from an optical device for propagation to the main body of the waveguide core or from the main body of the waveguide core for transmission to an optical device). In the disclosed monitoring system and method embodiments, an assessment of the optical interface can be performed using electric signals generated by the photodetectors.

More particularly, disclosed herein are embodiments of a PIC chip structure that can include a waveguide core having an end portion with opposing sides. The PIC chip structure can further include a monitor and, particularly, a scattering light-based monitor that includes photodetectors adjacent to at least one side of the end portion. In this PIC chip structure, the end portion can receive light signals and the photodetectors of the monitor can sense scattering light emitted from the side(s) of the end portion as light signals are received by the end portion (e.g., either from an optical device for propagation to the main body of the waveguide core or from the main body of the waveguide core for transmission to an optical device).

Aspects of the PIC chip structure embodiments can include the preceding aspects and, optionally, the following aspects. Within the monitor, each photodetector can include a photodiode with an absorption region positioned laterally between a P-type semiconductor region and an N-type semiconductor region. Additionally, the monitor can include a collector body and collector extensions. The collector body can have a first sidewall with a first length adjacent to the side of the end portion and a second sidewall opposite the first sidewall and having a second length that is shorter than the first length. Each collector extension can extend from the collector body toward the absorption region of a corresponding photodiode.

Aspects of the PIC chip structure embodiments can include at least some of the preceding aspects and, optionally, the following aspects. Within the monitor, each photodetector can include a photodiode with an absorption region positioned laterally between a P-type semiconductor region and an N-type semiconductor region. Additionally, the monitor can include a first group of the photodetectors on a first side of the end portion and a second group of the photodetectors on a second side of the end portion. Additionally, the monitor can further include collector regions and, particularly, a first collector region between the first group of photodetectors and the end portion and a second collector region between the second group of photodetectors and the end portion. Each collector region can include a collector body and collector extensions. The collector body can have a first sidewall with a first length adjacent to the end portion and a second sidewall opposite the first sidewall and having a second length that is shorter than the first length. Each collector extension can extend from the collector body toward the absorption region of a corresponding photodiode.

Aspects of the PIC chip structure embodiments can include at least some of the preceding aspects and, optionally, the following aspects. Within the monitor, the photodetectors can have discrete outputs or, alternatively, two or more of the photodetectors can be connected in series to produce a combined output.

Aspects of the PIC chip structure embodiments can include at least some of the preceding aspects and, optionally, the following aspects. Within the monitor, the photodetectors can include PIN photodiodes, avalanche photodiodes, or a combination of PIN and avalanche photodiodes.

Aspects of the PIC chip structure embodiments can include at least some of the preceding aspects and, optionally, the following aspects. The end portion of the waveguide core can be located at an optical interface with another optical device. The end portion can either receive the light signals from the optical device for propagation to the main body of the waveguide core or can receive light signals from the main body of the waveguide core for transmission to the optical device.

Aspects of the PIC chip structure embodiments can include at least some of the preceding aspects and, optionally, the following aspects. The optical device at the optical interface can be a light source, such as an optic fiber, a laser, or a second waveguide core. The end portion of the waveguide core can receive the light signals from the light source for propagation to the main body. The PIC chip structure can further include an additional waveguide core tapping off the waveguide core and an additional photodetector coupled to the additional waveguide core.

Aspects of the PIC chip structure embodiments can include at least some of the preceding aspects and, optionally, the following aspects. The waveguide core can be, for example, a silicon waveguide core, a silicon nitride waveguide core, a silicon oxynitride waveguide core or an aluminum nitride waveguide core.

Also disclosed herein are embodiments of a monitoring system that incorporates the above-described PIC chip structure. Specifically, the monitoring system can include a processor and a communication network between the processor and a monitor of a PIC chip structure, as described above. That is, the monitor can include photodetectors adjacent to at least one side of an end portion of a waveguide core at an optical interface with an optical device. The photodetectors can generate and output electric signals in response to scattering light emitted from the side(s) of the end portion of the waveguide core as the end portion receives light signals (e.g., either from an optical device for propagation to the main body of the waveguide core or from the main body of the waveguide core for transmission to an optical device) and those light signals pass therethrough. The communication network can receive the electric signals from the monitor and can communicate them to the processor. The processor can perform an assessment of the optical interface (e.g., can assess the performance or health of the optical interface) using the electric signals.

Aspects of the monitoring system embodiments can include at least some of the preceding aspects and, optionally, the following aspects. Within the monitor, each photodetector can include a photodiode with an absorption region positioned laterally between a P-type semiconductor region and an N-type semiconductor region. Additionally, the monitor can further include a collector body and collector extensions. The collector body can have a first sidewall with a first length adjacent to the side of the end portion and a second sidewall opposite the first sidewall and having a second length that is shorter than the first length. Each collector extension can extend from the collector body toward the absorption region of a corresponding photodiode.

Aspects of the monitoring system embodiments can include at least some of the preceding aspects and, optionally, the following aspects. Within the monitor, each photodetector can include a photodiode with an absorption region positioned laterally between a P-type semiconductor region and an N-type semiconductor region. The photodetectors can include a first group of photodetectors on a first side of the end portion and a second group of photodetectors on a second side of the end portion. The monitor can further include collector regions including a first collector region between the first group of photodetectors and the end portion and a second collector region between the second group of photodetectors and the end portion. Each collector region can include a collector body and collector extensions. The collector body can have a first sidewall with a first length adjacent to the end portion and a second sidewall opposite the first sidewall and having a second length that is shorter than the first length. Each collector extension can extend from the collector body toward the absorption region of a corresponding photodiode.

Aspects of the monitoring system embodiments can include at least some of the preceding aspects and, optionally, the following aspects. Within the monitor, each of the photodetectors can have discrete outputs or, alternatively, two of the photodetectors can be connected in series to produce a combined output.

Aspects of the monitoring system embodiments can include at least some of the preceding aspects and, optionally, the following aspects. Within the monitor, the photodetectors can include PIN photodiodes, avalanche photodiodes, or a combination of PIN and avalanche photodiodes.

Aspects of the monitoring system embodiments can include at least some of the preceding aspects and, optionally, the following aspects. The end portion of the waveguide core can be located at an optical interface with another optical device. The end portion can either receive the light signals from the optical device for propagation to the main body of the waveguide core or can receive light signals from the main body of the waveguide core for transmission to the optical device.

Aspects of the monitoring system embodiments can include at least some of the preceding aspects and, optionally, the following aspects. The optical device at the optical interface can be a light source, such as an optic fiber, a laser, or a second waveguide core. Within the PIC chip structure, the end portion of the waveguide core can receive the light signals from the light source for propagation to the main body. The PIC chip structure can further include an additional waveguide core tapping off the waveguide core and an additional photodetector coupled to the additional waveguide core. The additional photodetector can output an additional electric signal in response to the light signals propagating through the waveguide core. The communication network can receive the additional electric signal and communicate the additional electric signal to the processor and the processor can perform the assessment of the optical interface also using the additional electric signal.

Aspects of the monitoring system embodiments can include at least some of the preceding aspects and, optionally, the following aspects. Within the PIC chip structure, waveguide core be, for example a silicon waveguide core, a silicon nitride waveguide core, a silicon oxynitride waveguide core or an aluminum nitride waveguide core.

Also disclosed herein are embodiments of a monitoring method. The monitoring method can include receiving, by a communication network, electric signals. The communication network can receive the electric signals from a monitor of a PIC chip structure. Specifically, the monitor can include photodetectors adjacent to at least one side of an end portion of a waveguide core at an optical interface. These photodetectors can generate and output the electric signals in response to scattering light emitted from the side(s) of the end portion of the waveguide core as the end portion receives light signals (e.g., either from an optical device for propagation to the main body of the waveguide core or from the main body of the waveguide core for transmission to an optical device) and those light signals pass therethrough. The method can further include communicating, by the communication network, the electric signals to a processor. The method can further include assessing, by the processor, the optical interface using the electric signals.

BRIEF DESCRIPTION OF THE SEVERAL VIEWS OF THE DRAWINGS

The present disclosure will be better understood from the following detailed description with reference to the drawings, which are not necessarily drawn to scale and in which:

FIGS. 1A-1D are layout diagrams illustrating disclosed embodiments of a photonic integrated circuit (PIC) chip structure including a scattering light-based monitor and disclosed embodiments of a monitoring system incorporating the PIC chip structure;

FIGS. 5A-1 to 5A-3, FIGS. 5B-1 to 5B-3, FIGS. 5C-1 to 5C-2, FIGS. 5D-1 to 5D-2, and FIGS. 5E-1 to 5E-2 are sets of diagrams showing different illustrative optical interfaces, respectively, that can be incorporated into the disclosed structures of FIGS. 1A-1D;

FIGS. 6A-6C are diagrams illustrating different illustrative configurations for the monitoring system of FIGS. 1A-1D;

DETAILED DESCRIPTION

Figure 1A:
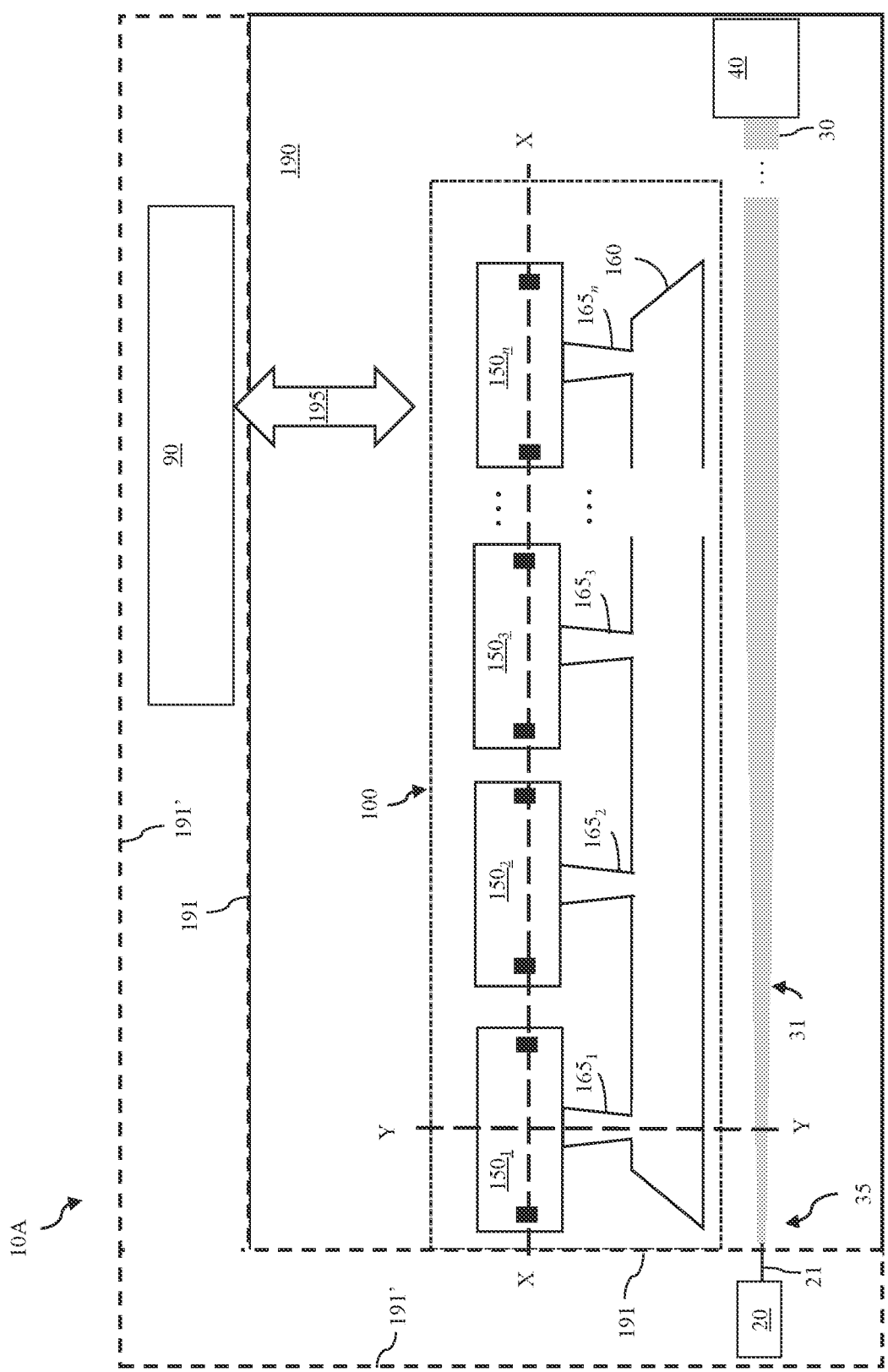
Figure 1B:
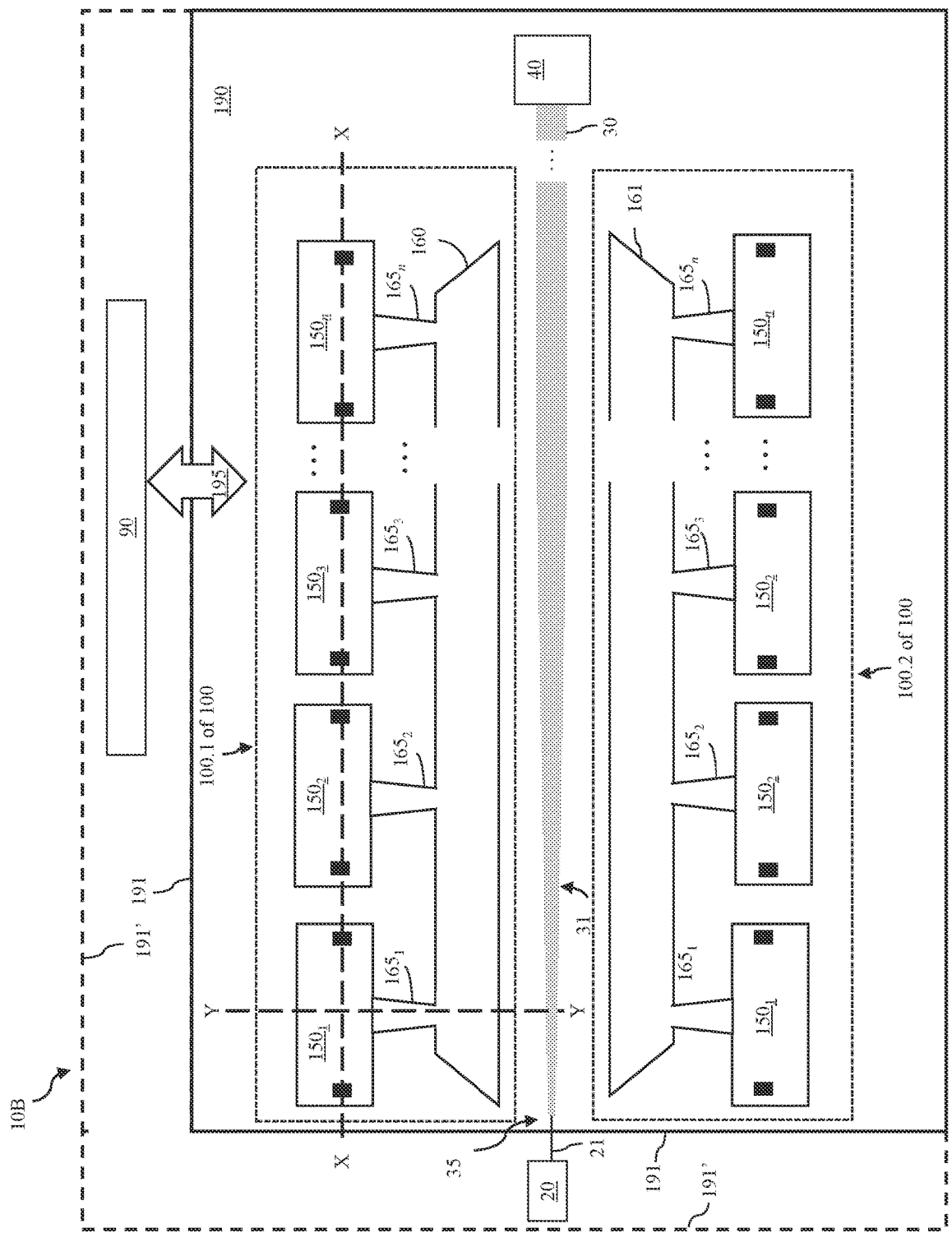

As mentioned above, optical interfaces, such as off-chip to on-chip optical interfaces or on-chip optical interfaces (e.g., intra-layer or inter-layer optical interfaces), are often weak links in PIC systems. Typically, to monitor the performance of an optical interface, a tap is placed on a downstream waveguide adjacent to the optical interface at issue and this tap is further connected to a photodetector, which monitors the photonic energy of light signals received by the downstream waveguide and propagated therethrough. However, such a tap will consume some percentage (e.g., up to 5% or more) of the optical budget. Additionally, any detected change in the photonic energy could be due to any one of several problems including, for example, a problem with the transmitting light source itself or a problem with the coupling mechanism between the light source and the downstream waveguide.

In view of the foregoing, disclosed herein are embodiments of a PIC chip structure including a scattering light-based monitor, embodiments of a monitoring system including the PIC chip structure with the scattering light-based monitor, and embodiments of an associated monitoring method. Specifically, disclosed herein are embodiments of a PIC chip structure that includes a scattering light-based monitor. This monitor can include photodetectors (e.g., PIN and/or avalanche photodiodes) placed adjacent to one or both sides of an end portion (i.e., a coupler portion, also referred to herein as a coupler) of a waveguide core. The photodetectors can be physically separated from the end portion (e.g., either by cladding material alone or by a combination of cladding material and a large aperture collector) but, in any case, placed in such a way as to enable sensing of scattering light emitted from the side(s) of the end portion as light signals are received by the end portion (e.g., from an optical device for propagation to a main body of the waveguide core or from the main body of the waveguide core for transmission to the optical device) and pass therethrough. Optionally, this monitor can also include an additional photodetector that senses a tapped portion of received light signals from an optical device. In the disclosed monitoring system and method embodiments, an assessment of the optical interface can be performed (i.e., the health or performance of the optical interface can be assessed) using electric signals generated by the photodetectors and, if applicable, using an additional electric signal generated by the additional photodetector.

More particularly, FIGS. 1A-1D are layout diagrams illustrating monitoring systems 10A-10D, respectively. Each monitoring system 10A-10D can include a photonic integrated circuit (PIC) chip structure 190.

The PIC chip structure 190 can include at least one waveguide. This waveguide can include a waveguide core 30 can be made of any suitable waveguide core material. For example, the waveguide core 30 could be a silicon (Si) waveguide core (e.g., with a refractive index of 3 or larger and typically between 3.3 and 3.6), a silicon nitride (SiN) waveguide core with a refractive index of approximately 2.0, or a waveguide core of any other suitable waveguide core material (e.g., polySi, silicon germanium (SiGe), poly-SiGe, a silicon oxynitride (SiON) waveguide core, an aluminum nitride (AlN) waveguide core, etc.).

The waveguide can further include waveguide cladding surrounding and immediately adjacent to the surfaces of the waveguide core 30. The function of the cladding material is to confine the optical signals within the waveguide core by reflection at interfaces between the core and cladding materials. The waveguide cladding adjacent to the waveguide core 30 can be a single cladding material. Alternatively, the waveguide cladding can be made up of different cladding materials adjacent to different regions and/or different surfaces of the waveguide core 30. In any case, to facilitate and control optical signal propagation within the waveguide core 30, the refractive index of the cladding material used (or the refractive indices of the different cladding materials used, if applicable) should be smaller than the refractive index (or the multiple refractive indices) of the core material. Those skilled in the art will recognize that the same material may be incorporated into one waveguide for the waveguide core and in another waveguide for the waveguide cladding.

For example, if the waveguide core 30 is Si with a refractive index between 3.3 and 3.6, the cladding material surrounding the waveguide core 30 could be silicon dioxide (SiO2), which as a refractive index of less 1.6, or SiN, which has a refractive index of approximately 2. If the waveguide core 30 is SiN with a refractive index of approximately 2.0, the cladding material surrounding the waveguide core 30 could also be SiO2.

The various cladding materials mentioned above are provided for illustration purposes. Alternatively, any other suitable cladding material could be used, depending upon the core material. The following is a list of possible materials (including the refractive indices (n) thereof) that could potentially be incorporated into a waveguide as cladding material or core material, depending upon the selected materials and the refractive index differential between them (i.e., as long as the cladding material has a smaller refractive index than the core material it clads):

(1) HfO2 (Hafnium dioxide), n=2.0754 @1.31 um, n=2.0709 @1.55 um;
(2) ZrO2 (Zirconium dioxide, Zirconia), n=2.1155 @1.31 um, n=2.1103 @1.55 um;
(3) Si3N4, n=~2;
(4) SiON, n=~1.46 to ~2.1;
(5) AlN (Aluminum nitride), n=~2.1 to ~2.4;
(6) TiO2 (Titanium dioxide), n=2.4622 @1.31 um, n=2.4538 @1.55 um;
(7) ZnO (Zinc monoxide), n=1.9318 @1.31 um, n=1.9267 @1.55 um;
(8) Al2O3 (Aluminum oxide), n=1.7503 @1.31 um, n=1.7462 @1.55 um;
(9) MgO (Magnesium oxide), n=1.7178 @1.31 um, n=1.7146 @1.55 um;
(10) SiO2 (Silicon dioxide), n<1.6, n=1.45 @1.31 um;

(11) CaF2 (Calcium fluoride), n=1.4272 @1.31 um, n=1.4260 @1.55 um;
(12) OMCTS (SiCOH) n=1.406 @1.31 um; and
(13) MgF2 (Magnesium fluoride), n=1.3718 @1.31 um, n=1.3705 @1.55 um.

The waveguide core 30 can have a strip/wire geometry. That is, waveguide core 30 can be an elongated body and a vertical cross-sectional shape of this elongated body cutting across its width can be essentially rectangular with a planar bottom surface, a planar top surface opposite the planar bottom surface, and opposing sidewalls. Alternatively, the waveguide core 30 could have some other suitable geometry (e.g., a rib geometry (not shown), etc.). The waveguide core 30 can be essentially linear, as illustrated. Alternatively, the waveguide core 30 could have one or more curved sections, not shown. In any case, the waveguide core 30 can have an end portion 31 and a main body, which extends between the end portion and, for example, a functional circuit block 40 of the PIC chip structure 190. This end portion 31 can be configured to function as a coupler on one side of an optical interface 35 that facilitates communication of light signals between the waveguide core 30 and an optical device 20, as discussed in greater detail below. Thus, the end portion 31 can be tapered, as illustrated. That is, the width of the end portion 31 can decrease between the main body and the distal end. However, it should be understood that the figures are not intended to be limiting and that, alternatively, this end portion 31 could have any suitable shape and size to function as a coupler, given the optical interface at issue. For example, the end portion 31 could have a uniform width, could increase in width between the main body and the distal end, could be split (e.g., forked) with two or more uniform-width or tapered extensions, could be configured as a grating coupler, etc.

The optical device 20 can be an off-chip optical device. That is, as illustrated, the optical device 20 can be located off the PIC chip structure and, particularly, outside the external boundaries 191 of the PIC chip structure 190. Alternatively, the optical device 20 can be an on-chip optical device. That is, it can be located on the PIC chip structure 190 (e.g., see the alternative external boundaries 191' and the optical device 20 within the alternative external boundaries 191'). In other words, the optical interface 35 can be an off-chip to on-chip optical interface or an on-chip optical interface (e.g., an intra-layer optical interface or an inter-layer optical interface). Furthermore, depending upon the type of optical device, the optical interface can facilitate transmission of light signals 21 from the optical device 20 to the waveguide core 30 or from the waveguide core 30 to the optical device 20. For example, in some embodiments the optical device 20 could be a light source such that light signals 21 are received by the end portion 31 for propagation to the main body of the waveguide core 30. Such a light source could be, for example, a laser, an optic fiber, or another waveguide. In other embodiments, the optical device 20 is suitable for receiving light signals 21 from the end portion 31 through the optical interface 35. Such an optical device 20 could, for example, be an optic fiber or another waveguide.

Illustrative optical interfaces with scattering light-based monitors are discussed in greater detail below and shown in FIGS. 5A-1 to 5A-3, FIGS. 5B-1 to 5B-3, FIGS. 5C-1 to 5C-2, FIGS. 5D-1 to 5D-2, and FIGS. 5E-1 to 5E-2.

As mentioned above, optical interfaces, such as off-chip to on-chip optical interfaces (or vice versa) or on-chip optical interfaces (e.g., intra-layer optical interfaces or inter-layer optical interfaces), are often weak links in PIC systems. Therefore, the PIC chip structure 190 further includes a monitor 100 and, particularly, a scattering light-based monitor 100.

The scattering light-based monitor 100 can include multiple photodetectors $150_1$-$150_n$ adjacent to at least one side of the end portion 31 of the waveguide core 30. For example, the monitor 100 can have one group of photodetectors located on one side only of the end portion 31 (e.g., see FIGS. 1A and 1C). Alternatively, the monitor 100 can include two groups (i.e., a first group 100.1 and second group 100.2) of photodetectors located on opposite sides of the end portion 31 (see FIGS. 1B and 1D). The photodetectors $150_1$-$150_n$ can be physically separated from the end portion 31 but placed in such a way as to enable sensing of scattering light emitted from the side(s) of the end portion 31 as light signals 21 pass one way or the other through the optical interface 35 (i.e., from the optical device to the end portion of the waveguide core and into the main body of the waveguide core or vice versa). Those skilled in the art will recognize that optical loss from a waveguide core as light signals propagate therethrough are generally due to scattering loss, absorption loss, and radiation loss. Scattering loss refers to a mechanism by which scattering light escapes (i.e., leaves) the confines of the waveguide core. Scattering light refers to light that changes the direction of travel due to various mechanisms (e.g., surface roughness or contamination, crystalline defects, voids, or the like within the waveguide core, mode mismatching, and misalignment). Scattering loss is often relatively high at or near an end portion of a waveguide core at an optical interface and, particularly, at an optical I/O interface due specifically to mode mismatch and misalignment. For example, in any of the structures shown in FIGS. 1A-1D, scattering light can be caused by the mismatch between the mode of the optical device 20 and the mode of the end portion 31 (i.e., the coupler) of the waveguide core 30 and can further be caused by imperfect alignment between the two. As a result, scattering light is typically higher outside the relatively small area around the end portion 31. Thus, the photodetectors $150_1$-$150_n$ for the monitor are placed in this area. The photodetectors $150_1$-$150_n$ can, for example, be photodiodes, such as PN photodiodes. Those skilled in the art will recognize that a PN photodiode can include a P-type semiconductor region, such as a P-type Si region, with a relatively shallow P+ contact region at the top surface connected to an anode contact, positioned immediately adjacent to an N-type semiconductor region, such as an N-type Si region, with a relatively shallow N+ contact region at the top surface connected to a cathode contact. In this case, exposure of the PN junction to the scattering light from the side of the end portion of the waveguide core can result in electric current flow from the anode contact to the cathode contact (i.e., can result in an electric signal output as a function of the photonic energy of the scattering light).

Figure 2A:
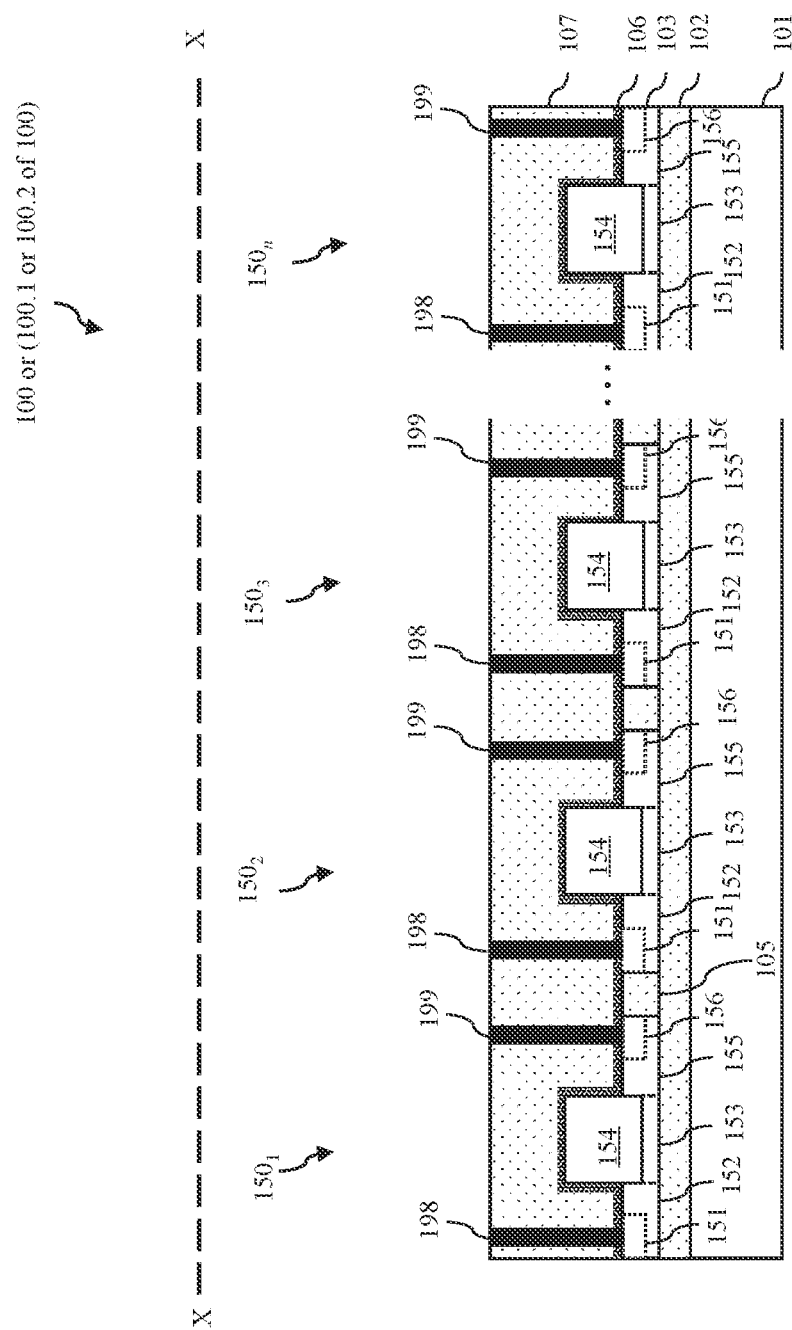
FIGS. 2A-3 are cross-section diagrams showing illustrative scattering light-based monitors, respectively, that can be incorporated into the disclosed structures of FIGS. 1A-1D.

Alternatively, for better performance (e.g., for faster response speeds) the photodetectors $150_1$-$150_n$ can be PIN photodiodes, such as germanium (Ge) PIN photodiodes. For example, FIG. 2A is an XX cross-section diagram illustrating a portion of the PIC chip structure 190 on one side of the end portion 31 of the waveguide core 30 where the photodetectors $150_1$-$150_n$ are Ge PIN photodiodes. As illustrated, the PIC chip structure 190 can be a semiconductor-on-insulator structure (e.g., a silicon-on-insulator (SOI) structure). That is, it can include a semiconductor substrate 101 (e.g., a Si substrate), an insulator layer 102 (e.g., a buried oxide (BOX) layer or some other suitable insulator layer) on the semiconductor substrate 101, and a semiconductor layer 103 (e.g., a Si layer) on the insulator layer 102. Alternatively, the PIC chip structure 190 could be a bulk semiconductor structure (e.g., a bulk Si structure). Shallow trench isolation (STI) regions 105 can extend through the semiconductor layer 103 and can define the active regions for the photodetectors $150_1$-$150_n$ and, particularly, for the PIN photodiodes. Each PIN photodiode can include in a corresponding active region: a P-type semiconductor region 155, such as a P-type Si region, with a relatively shallow P+ contact region 156 at the top surface; an N-type semiconductor region 152, such as an N-type Si region, with a relatively shallow N+ contact region 151 at the top surface; and an intrinsic semiconductor region (e.g., an undoped Si region), which is also referred to as an absorption region, positioned between the P-type semiconductor region 155 and the N-type semiconductor region 152. Since Ge has a significantly higher absorption coefficient than Si, Ge or SiGe can be used as the primary material within the absorption region. For example, in one exemplary process flow for a lateral Ge PIN photodiode, a center portion of the semiconductor layer 103 within an active region between a P-type semiconductor region 155 and an N-type semiconductor region 152 can be recessed, leaving a relatively thin intrinsic semiconductor portion 153 therebetween. Then, an intrinsic Ge or SiGe layer 154 can be epitaxially grown on the thin semiconductor portion 153. The PIN photodiodes can, for example, be covered by one or more interlayer dielectric (ILD) layers (e.g., a relatively thin conformal etch stop layer 106, such as a SiN etch stop layer, and a blanket dielectric layer 107, such as a blanket SiO2 layer). Middle-of-the-line (MOL) contacts can extend through the ILD layers to the PIN photodiodes and can include, for example, anode contacts 199 on the P+ contact regions 156 and cathode contacts 198 on the N+ contact regions 151. In such a PIN photodiode, exposure of the absorption region 153/154 to scattering light from a side of the end portion 31 of the waveguide core 30 can result in current flow between the anode contact 199 and the cathode contact 198 (i.e., can result in an electric signal output as a function of the photonic energy of the scattering light).

Figure 2B:
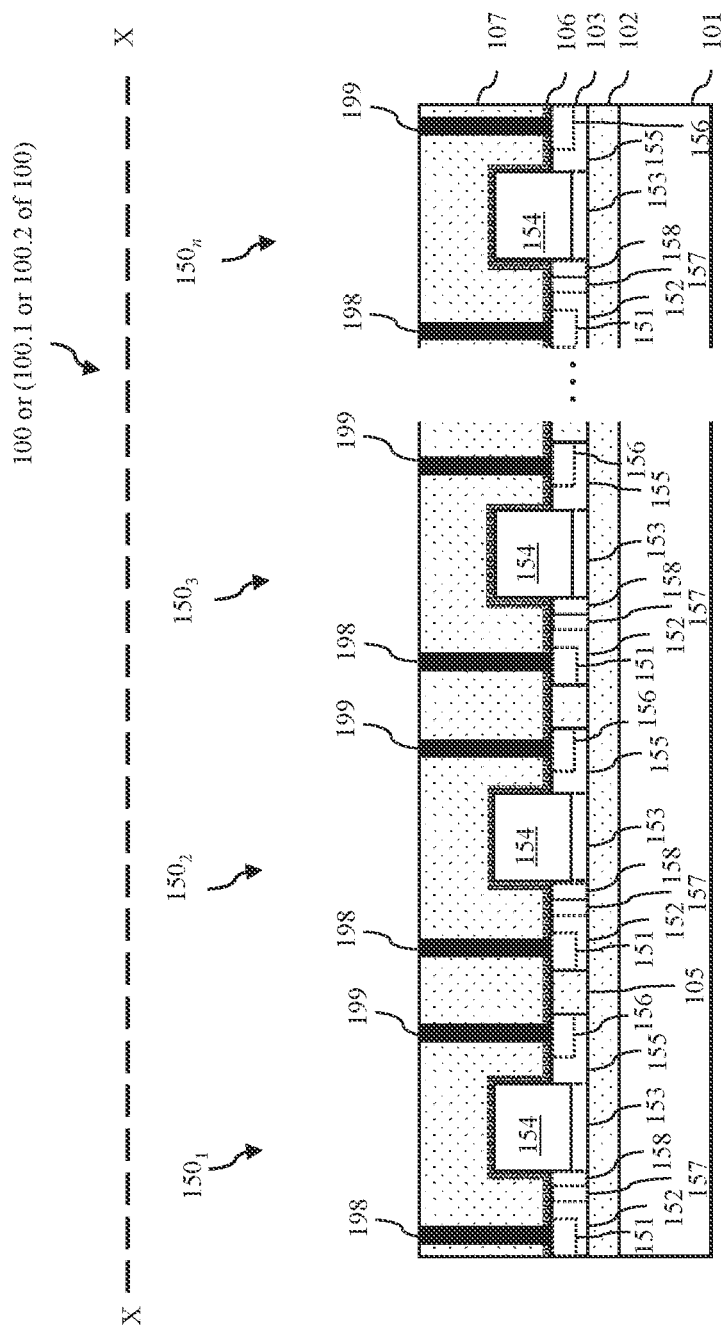

Alternatively, for even better performance (e.g., for increased sensitivity and faster response speeds) the photodetectors $150_1$-$150_n$ can be avalanche photodiodes, such as Ge avalanche photodiodes. For example, FIG. 2B is an XX cross-section diagram illustrating a portion of the PIC chip structure 190 on one side of the end portion 31 of the waveguide core 30 where the photodetectors $150_1$-$150_n$ are Ge avalanche photodiodes. As illustrated, the PIC chip structure 190 can be a semiconductor-on-insulator structure (e.g., an SOI structure). That is, it can include a semiconductor substrate 101 (e.g., a Si substrate), an insulator layer 102 (e.g., a buried oxide (BOX) layer or some other suitable insulator layer) on the semiconductor substrate 101, and a semiconductor layer 103 (e.g., a Si layer) on the insulator layer 102. Alternatively, the PIC chip structure 190 could be configured as a bulk semiconductor structure (e.g., a bulk Si structure). Shallow trench isolation (STI) regions 105 can extend through the semiconductor layer 103 and can define the active regions for the photodetectors $150_1$-$150_n$ and, particularly, for the avalanche photodiodes. Each avalanche photodiode can, like the PIN photodiodes of FIG. 2A, include a corresponding active region: a P-type semiconductor region 155, such as a P-type Si region, with a relatively shallow P+ contact region 156 at the top surface; an N-type semiconductor region 152, such as an N-type Si region, with a relatively shallow N+ contact region 151 at the top surface; and an intrinsic semiconductor region (e.g., an undoped Si region), which is also referred to as an absorption region, positioned between the P-type semiconductor region 155 and the N-type semiconductor region 152. The absorption region can, for example, include a relatively thin intrinsic Si portion 153 and a thicker intrinsic epitaxial Si or SiGe layer 154 above. However, in addition to these components, the avalanche photodiode can further include, sandwiched between the N-type semiconductor regions 152 and the absorption region 153/154, a multiplication region 157 (e.g., an intrinsic Si region) and a charge region 158 (e.g., a second P-type semiconductor region, such as a second P-type Si region). The avalanche photodiodes can, like the PIN photodiodes of FIG. 2A, be covered by one or more interlayer dielectric (ILD) layers (e.g., a relatively thin conformal etch stop layer 106, such as a SiN etch stop layer, and a blanket dielectric layer 107, such as a blanket SiO2 layer). MOL contacts can extend through the ILD layers to the PIN photodiodes and can include, for example, anode contacts 199 on the P+ contact regions 156 and cathode contacts 198 on the N+ contact regions 151. In such an avalanche photodiode, exposure of the absorption region 153/154 to scattering light from a side of the end portion 31 of the waveguide core 30 can result in current flow between the anode contact 199 and the cathode contact 198 (i.e., can result in an electric signal output as a function of the photonic energy of the scattering light). In this case, the Ge avalanche photodiodes are even more sensitive to the scattering light than the Ge PIN photodiodes.

It should be understood that the types of photodetectors and, particularly, the types of photodiodes as well as the materials used therein are provided for illustration purposes. Alternatively, any other suitable photodetector structure could be employed for sensing scattering light emitted from a side of the end portion 31 of the waveguide core 30 and, in response, outputting an electric signal.

For purposes of illustration, FIG. 2A shows all the photodetectors $150_1$-$150_n$ on a given side of the end portion 31 of the waveguide core 30 as being PIN photodiodes (e.g., Ge PIN photodiodes) and FIG. 2B shows all the photodetectors $150_1$-$150_n$ on a given side of the end portion 31 of the waveguide core 30 as being avalanche photodiodes (e.g., Ge avalanche photodiodes). However, in some embodiments, whether the monitor has photodetectors on one side (e.g., FIGS. 1A and 1C) or both sides (e.g., FIGS. 1B and 1D), the photodetectors $150_1$-$150_n$ can all be the same type of photodetector with the same design specifications. In some embodiments, where the monitor has photodetectors on both sides (e.g., FIGS. 1B and 1D), the photodetectors $150_1$-$150_n$ in the first group 100.1 can all be the same type of photodetector with the same design specifications and the photodetectors $150_1$-$150_n$ in the second group 100.2 can all be a different type or have different design specifications relative to the photodetectors in the first group 100.1. For example, the photodetectors $150_1$-$150_n$ in the first group 100.1 could be Ge PIN photodetectors, as shown in FIG. 2A, and the photodetectors $150_1$-$150_n$ in the second group 100.2 could be Ge avalanche photodetectors, as shown in FIG. 2B. In still other embodiments, whether the monitor has photodetectors on one side (e.g., FIGS. 1A and 1C) or both sides (e.g., FIGS. 1B and 1D), at least some of the photodetectors $150_1$-$150_n$ on the same side can be different types or have different specifications. For example, FIG. 2C is an XX cross-section diagram illustrating a portion of the PIC chip structure 190 on one side of the end portion 31 of the waveguide core 30 where two or more of the photodetectors $150_1$-$150_n$ are different types of photodetectors (e.g., Ge PIN and Ge avalanche photodiodes).

Figure 3:
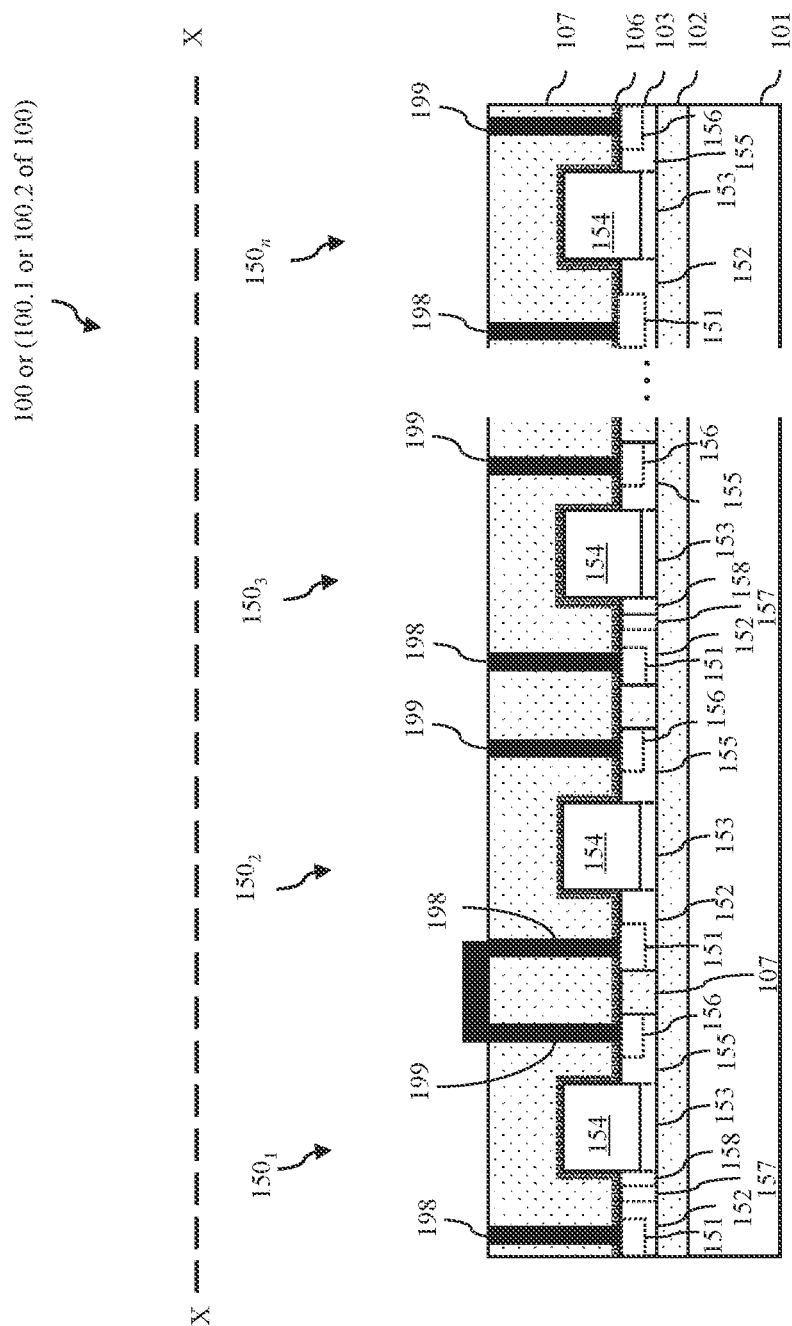

It should be understood that each photodetector $150_1$-$150_n$ can be a discrete sensor with a discrete electric signal output. Alternatively, as illustrated in FIG. 3, any two or more of the photodetectors $150_1$-$150_n$ on a given side of the end portion 31 of the waveguide core 30 can be electrically connected in series (i.e., series-connected) to form a string with a combined electric signal output. It should be noted that the electrical connection between photodetectors can be formed through back-end-of-the-line (BEOL) wiring, as illustrated. Alternatively, the electrical connection between photodetectors could be a local connection (e.g., a silicide layer extending across the STI region 105 between adjacent photodetectors, not shown). Alternatively, any other suitable technique for connecting adjacent photodetectors in a string could be employed. Connecting at least some of the photodetectors $150_1$-$150_n$ could be used to improve sensitivity to the scattering light.

As mentioned above, cladding material alone may separate the photodetectors $150_1$-$150_n$ from the end portion 31 of the waveguide core 30. As long as, due to placement and sensitivity, the photodetectors $150_1$-$150_n$ can sense the scattering light emitted from the side(s) the end portion 31 of the waveguide core 30. Optionally, as shown in FIGS. 1A-1D, to improve the likelihood of the photodetectors $150_1$-$150_n$ sensing the scattering light, a large aperture collector can be positioned between the end portion 31 of the waveguide core 30 and photodetectors $150_1$-$150_n$ on one or both sides. Each large aperture collector can include a collector body 160 and, optionally, collector extensions $165_1$-$165_n$. The collector body 160 and, if applicable, the collector extensions $165_1$-$165_n$, can, for example, patterned from the same semiconductor layer 103 as that used for the photodiodes (see detailed discussion above and FIGS. 2A-3). The collector body 160 of the large aperture collector can have a first sidewall adjacent to one side of the end portion 31 of the waveguide core 30 by physically separated therefrom by cladding material (as discussed in greater detail below). The first sidewall can have a first length that is, for example, approximately equal to the length of the end portion 31 to facilitate capturing the scattering light emitted from the end portion 31 on that one side. The collector body 160 can further have a second sidewall opposite the first sidewall and adjacent to the photodetectors $150_1$-$150_n$, but physically separated therefrom. Surfaces of the collector body 160 can be surrounded by cladding material such that scattering light captured by collector body 160 can propagate toward the photodetectors $150_1$-$150_n$. In some embodiments, the collector extensions $165_1$-$165_n$ can extend from immediately adjacent to the second sidewall of the collector body 160 to the absorption regions (e.g., 153/154) of the photodetectors $150_1$-$150_n$, respectively, and can also be surrounded by cladding material. If, as discussed above, the thin portions 153 of the absorption regions of the photodetectors are formed using the semiconductor layer 103 and the large aperture collector is also formed using the semiconductor layer 103, the collector extensions $165_1$-$165_n$ and the thin portions 153 of the photodetector absorption regions will be continuous such that scattering light that is captured by the collector body 160 and propagates from the first sidewall toward the second sidewall is divided (i.e., split up) and further propagates through the collector extensions $165_1$-$165_n$ to the absorption regions of the photodetectors. In some embodiments, the second sidewall of the collector body 160 can have a second length that is shorter than the first length such the collector body 160 effectively funnels captured scattering light toward the collector extensions $165_1$-$165_n$.

Figure 4A:
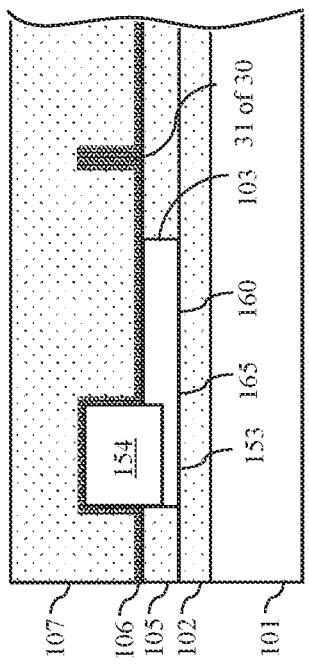
FIGS. 4A-4D are cross-section diagrams showing illustrative waveguide cores, respectively, that can be incorporated into the disclosed structures of FIGS. 1A-1D.

As mentioned above, the waveguide core 30 can be a Si waveguide core. FIG. 4A is a YY cross-section diagram illustrating a portion of the PIC chip structure 190 traversing the absorption region 153/154 of a photodetector, an adjacent large aperture collector (including the collector body 160 and the collector extension 165 that extends between collector body 160 and the absorption region 153/154, and a Si waveguide core adjacent to the first sidewall of the collector body 160, but physically separated therefrom by an STI region 105. In this case, the thin portion 153 of the absorption region 153/154, the large aperture collector, and the Si waveguide core are formed from the same semiconductor layer 103 (e.g., the same Si layer) and are essentially co-planar or at least have co-planar bottom surfaces on the top surface of the insulator layer 102.

Figure 4B:
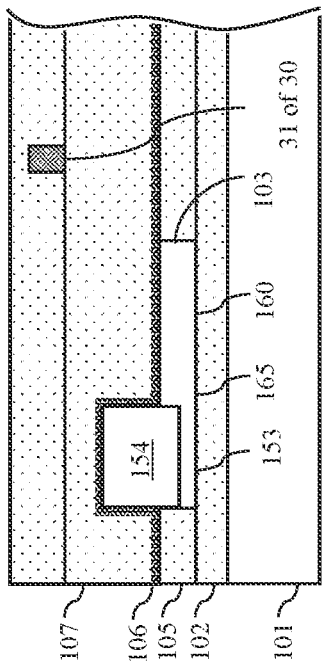
Figure 4C:
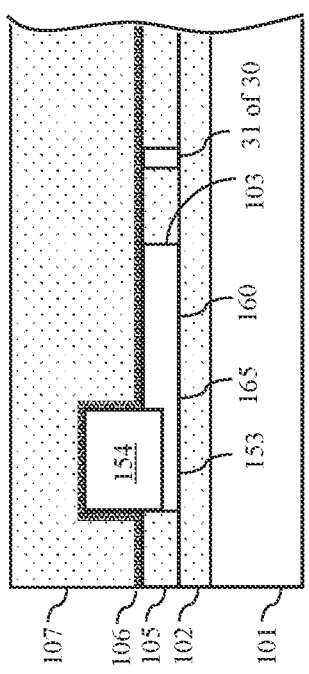
Figure 4D:
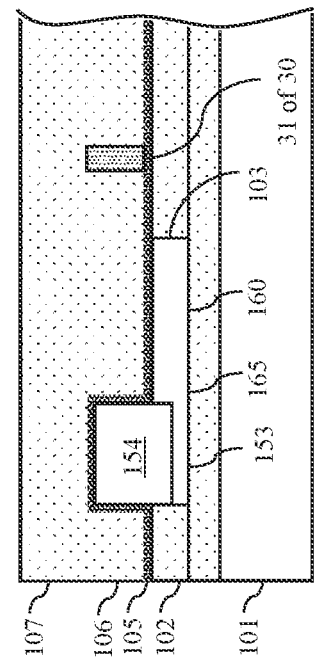

However, also as mentioned above, the waveguide core 30 could be made of some other core material and, thus, not co-planar with the thin portion 153 of the absorption region or the large aperture collector. For example, FIGS. 4B-4D are YY cross-section diagrams illustrating a portion of the PIC chip structure 190 traversing the absorption region 153/154 of a photodetector, an adjacent large aperture collector (including the collector body 160 and the collector extension 165 that extends between collector body 160 and the absorption region 153/154), and a different type of waveguide core adjacent to the first sidewall of the collector body 160, but at a different level. For example, as illustrated in FIG. 4B, the waveguide core 30 could be a SiN waveguide core on the conformal etch stop layer 106 (e.g., on the SiN etch stop layer). For example, as illustrated in FIG. 4C, the waveguide core 30 could be a waveguide core made of some other MOL dielectric material on the conformal etch stop layer 106 (e.g., on the SiN etch stop layer). For example, as illustrated in FIG. 4D, the waveguide core 30 could be a waveguide core made of a BEOL material on the blanket dielectric layer 107. It should be noted that with the configurations shown in FIGS. 4B-4D, the collector body 160 could, optionally, undercut the waveguide core 30.

Figure 1D:
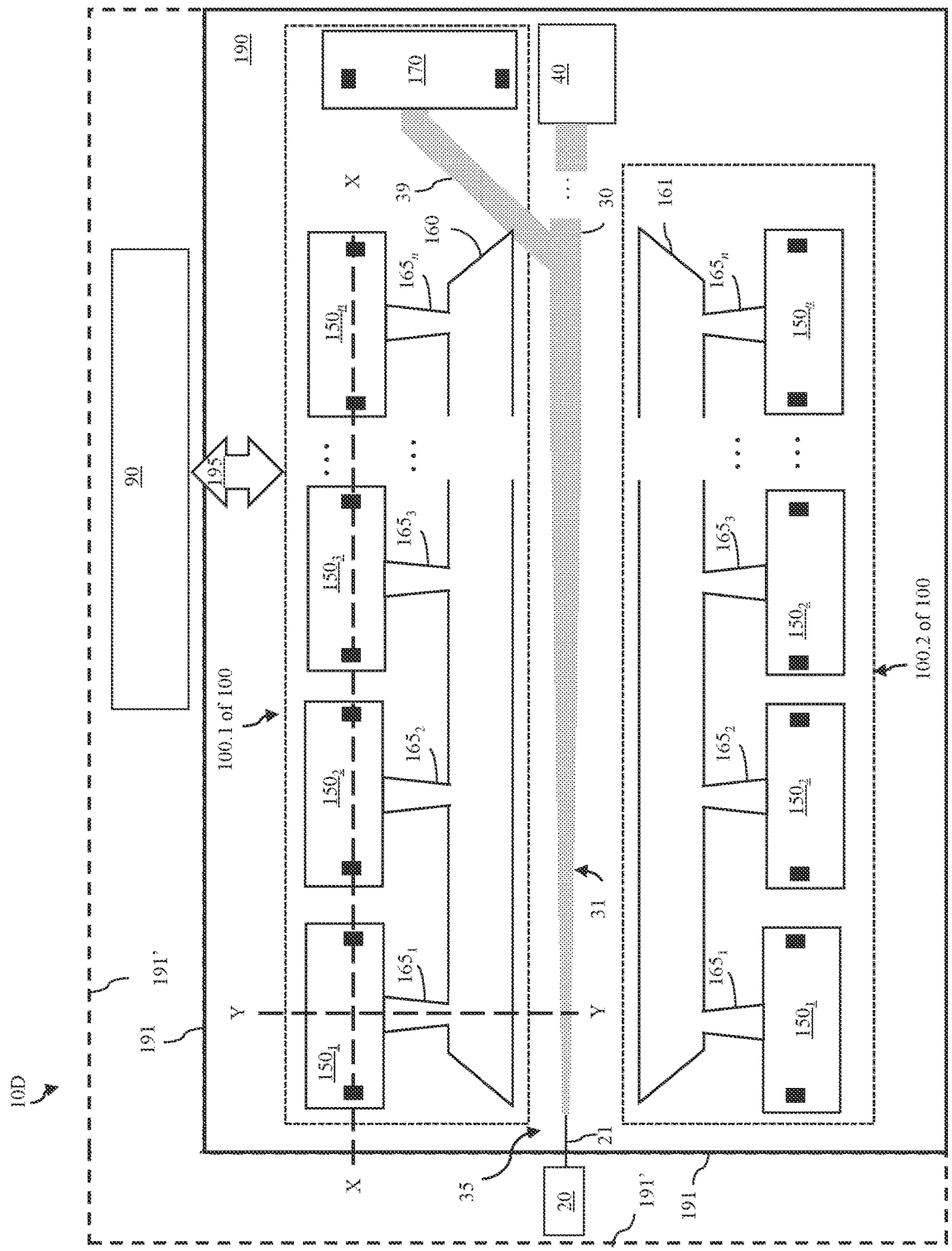
Figure 2C:
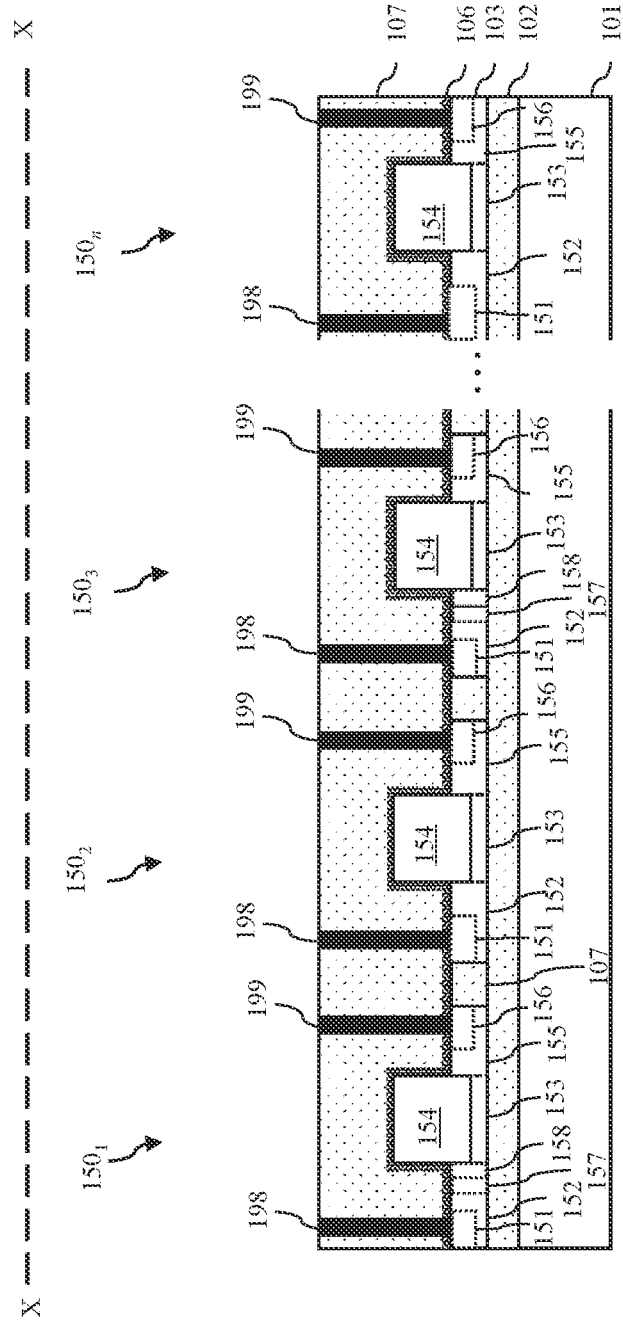

Optionally, as shown in FIGS. 1C and 1D, particularly in embodiments where the optical device 20 is a light source that transmits light to the end portion 31 for propagation to the main body of the waveguide core 30, the monitor 100 can further include at least one additional photodetector 170 and a tap (i.e., a split or Y-junction) off the waveguide core 30. The tap can include an additional waveguide core that extends directly from the waveguide core 30 to the additional photodetector 170 and that is surrounded by cladding material such that some light signals propagating through the waveguide core 30 are diverted into the tap and thereby to the additional photodetector 170. The additional photodetector 170 can, for example, be a PN photodiode, a PIN photodiode (e.g., a Ge PIN photodiode), or an avalanche photodiode (e.g., a Ge avalanche photodiode). The tapped light signals propagating to the additional photodetector 170 can cause current flow between anode and cathode contacts of the device (i.e., can result in an additional electric signal output as a function of the photonic energy of the tapped light). As mentioned above, such a tap will consume some percentage (e.g., up to 5% or more) of the optical budget.

As mentioned above, the optical device 20 can be an off-chip or on-chip optical device such that the optical interface 35 is either an off-chip to on-chip optical interface (or vice versa) or an on-chip optical interface (e.g., intra-layer optical interface or an inter-layer optical interface).

FIGS. 5A-1 to 5A-3, FIGS. 5B-1 to 5B-3, FIGS. 5C-1 to 5C-2, FIGS. 5D-1 to 5D-2, and FIGS. 5E-1 to 5E-2 are diagrams showing different illustrative optical interfaces 35 that could benefit from a scattering-light based monitor 100.

Figures 1, 5D:
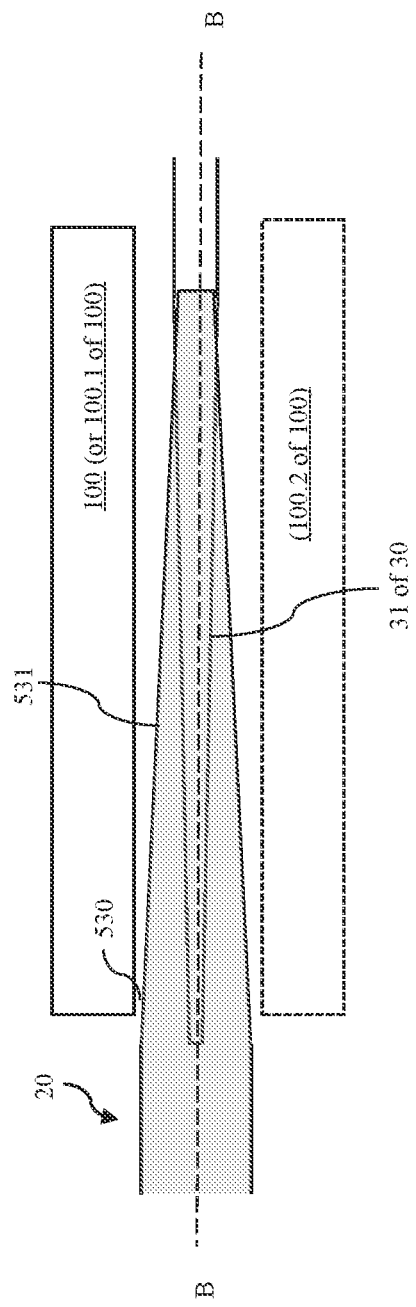
Figures 2, 5D:
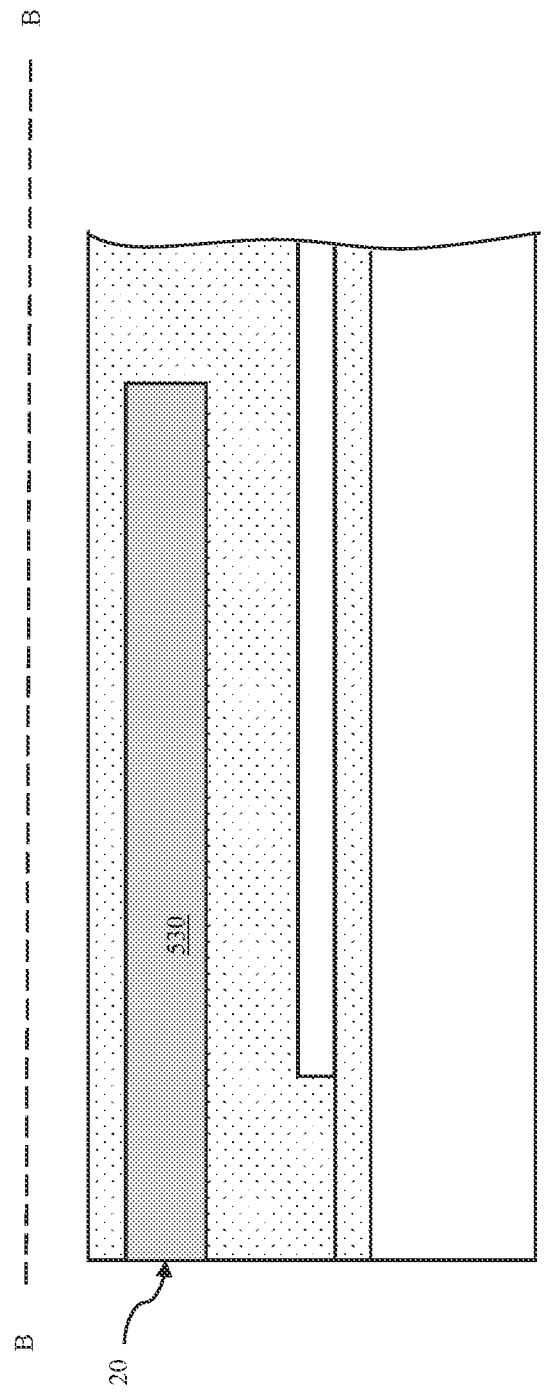

FIG. 5A-1 is a layout diagram and FIGS. 5A-2 and 5A-3 are different cross-section diagrams illustrating an on-chip optical interface. As illustrated, the optical device 20 is a light source, such as a laser 501 (e.g., a hybrid III-V laser), which is integrated on a monolithic silicon photonic platform. Specifically, the laser 501 can be flip-chip-bonded inside a cavity 502, which has been etched into the semiconductor substrate 101 (e.g., at the edge of the PIC chip structure 190 adjacent to the distal end of waveguide core 30 and, particularly, of the end portion 31). Wiring layers 504 and mechanical support "z-stop" 503 created within the cavity 502 provide electrical contacts to the laser and laser to PIC z-direction alignment. The end portion 31 of the waveguide core 30 can be tapered to function as a coupler for receiving light signals 21 from the laser 501 and, particularly, as a spot size converter (SCC). In this case, the monitor 100 can include single group of photodetectors on one side of the SCC/end portion 31 of the waveguide core 30 or two groups 100.1 and 100.2 of photodetectors on opposite sides of the SCC/end portion 31 of the waveguide core 30.

FIG. 5B-1 is a layout diagram and FIGS. 5B-2 and 5B-3 are different cross-section diagrams illustrating an off-chip to on-chip optical interface (or vice versa). As illustrated, the off-chip optical device 20 is an optic fiber 510. The optic fiber 510 includes a fiber core 512 surrounded by fiber cladding 511. Typically, the fiber core will be significant larger in diameter than the waveguide core to which it is to be coupled. The optic fiber 510 can be edge-coupled to the PIC chip structure 190. That is, it can be seated in a groove 515 (e.g., a V-shaped groove), which has been etched into the semiconductor substrate 101 (e.g., at the edge of the PIC chip structure 190 adjacent to the distal end of the waveguide core 30 and, particularly, of the end portion 31). The end portion 31 of the waveguide core 30 can be tapered to function as a coupler for the optic fiber 510 and, particularly, as a spot size converter (SCC) for either receiving light signals from the optic fiber 510 or transmitting light signals to the optic fiber 510. In this case, the monitor 100 can include single group of photodetectors on one side of the SCC/end portion 31 of the waveguide core 30 or two groups 100.1 and 100.2 of photodetectors on opposite sides of the SCC/end portion 31 of the waveguide core 30.

FIG. 5C-1 is a layout diagram and FIG. 5C-2 is a cross-section diagram illustrating another off-chip to on-chip optical interface (or vice versa). As illustrated, the off-chip optical device 20 is an optic fiber 520. The optic fiber 520 includes a fiber core 522 surrounded by fiber cladding 521. The optic fiber 520 can be vertically coupled to the PIC chip structure 190. In this case, the end portion 31 of the waveguide core 30 can be configured as a grating coupler 523 and the optic fiber 520 can be directed toward the grating coupler 523. Those skilled in the art will recognize that a grating coupler is a Bragg grating used to diffract light from the optic fiber into the waveguide core 30. The grating coupler 523 can be relatively wide with one end tapering down toward the main body of the waveguide core 30 to facilitate either receiving light signals from the optic fiber 520 or transmitting light signals to the optic fiber 520. In this case, the monitor 100 can include single group of photodetectors on one side of the grating coupler 523/end portion 31 or two groups 100.1 and 100.2 of photodetectors on opposite sides of the grating coupler 31/end portion 31 of the waveguide core 30. It should be understood that the configuration of the grating coupler shown in the figures is offered for illustration purposes and is not intended to be limiting. Various different grating coupler configurations are well known in the art and could, alternatively, be incorporated into the disclosed structure.

FIG. 5D-1 is a layout diagram and FIG. 5D-2 is a cross-section diagram illustrating an on-chip inter-layer optical interface. In this case, an upstream waveguide core 530 with a corresponding end portion 531 (i.e., a corresponding coupler) can be the optical device 20 (which functions as a light source in this case) in one layer of the PIC chip structure 190 and it can be coupled to the end portion 31 of the waveguide core 30. For example, the waveguide core 30 could be a Si waveguide core and the upstream waveguide core 530 could be a SiN waveguide core that is above the level of the Si waveguide core relative to the top surface of the insulator layer 102. The two waveguide cores can have overlapping end portions (i.e., the end portion 531 of the waveguide core 530 can overlay the end portion 31 of the waveguide core 30) for optical coupling. The end portions 531, 31 must be sufficiently close so that optical signals can pass between them at a location along the adjacent lengths of the core materials where mode matching occurs (i.e., where the propagation constant of optical mode inside the two waveguide cores becomes the same). To facilitate mode matching, one or both end portions 531, 31 of the two waveguide cores 530, 30 can be tapered, as illustrated. In this case, the monitor 100 can include a single group of photodetectors on one side of the end portion 31 of the waveguide core 30 or two groups 100.1 and 100.2 of photodetectors on opposite sides of the end portion 31 of the waveguide core 30.

FIG. 5E-1 is a layout diagram and FIG. 5E-2 is a cross-section diagram illustrating another on-chip inter-layer optical interface. This on-chip inter-layer optical interface can be configured essentially the same as the interface shown in FIGS. 5D-1 to 5D-2 above. However, optionally, to facilitate optical coupling between the end portions 531 and 31 of the waveguide cores 530 and 30 (e.g., when there is a significant separation distance between them), one or more additional waveguide couplers 540 (e.g., mini waveguide cores) could be stacked vertically between the end portions 531 and 31. In this case, mode matching can occur between the end portion 531 and the top waveguide coupler, between each waveguide coupler 540, and between the bottom waveguide coupler and the end portion 31 of the waveguide core 30, thereby allowing the light signals to move in stages from the waveguide core 530 down to the waveguide core 30. As with the structure shown in FIGS. 5D-1 to 5D-2, the monitor 100 can include a single group of photodetectors on one side of the end portion 31 of the waveguide core 30 or two groups 100.1 and 100.2 of photodetectors on opposite sides of the end portion 31 of the waveguide core 30.

The illustrative optical interfaces described above and shown in FIGS. 5A-1 to 5A-3, FIGS. 5B-1 to 5B-3, FIGS. 5C-1 to 5C-2, FIGS. 5D-1 to 5D-2, and FIGS. 5E-1 to 5E-2 are provided for illustration purposes and are not intended to be limiting. PIC chip structures with different types of off-chip to on-chip, on-chip to off-chip, or on-chip optical interfaces could benefit from the above-described scattering light-based monitor 100 that can be incorporated into a monitoring system 10A-10D.

Referring again to FIGS. 1A-1D, each monitoring system 10A-10D can further include at least one processor 90 (including, for example, a system controller, a data analyzer, etc.) and a communication network 195 that enables (i.e., that is adapted to enable, that is configured to enable, etc.) communications between the monitor 100 and the processor 90.

In some embodiments, the monitoring system 10A-10D can be a fully integrated system-on-chip (SOC). In these embodiments, the monitoring system 10A-10D can include the PIC chip structure 190 and the processor 90 can be located on the PIC chip structure 190 (e.g., see the processor 90 within the alternative external boundaries 191' for the PIC chip structure 190 as shown in FIGS. 1A-1D, see also the SOC of FIG. 6A). In other embodiments, the monitoring system 10A-10D can include a processor 90 that is external to the PIC chip structure 190 (e.g., see the processor 90 outside the external boundaries 191 for the PIC chip structure 190 as shown in FIGS. 1A-1D). For example, as illustrated in FIG. 6B, monitoring system 10A-10D can include multiple chips can be mounted to a chip carrier 605 (or, alternatively, in another type of multi-chip package). The chips can include the PIC chip structure 190 and at least one additional chip including the integrated circuit (IC) chip 601, which includes the monitoring system processor 90. Alternatively, as illustrated in FIG. 6C, the monitoring system 10A-10D can include the PIC chip structure 190 and a remote computerized device 650 (e.g., a server, desktop computer, laptop computer, tablet computer, smart phone, etc.) that includes the processor 90.

Those skilled in the art will recognize that the type of communication network 195 included in the monitoring system 10A-10D will vary depending upon whether the processor 90 is local or remote. For example, the communication network 195 of a SOC can include a combination of interconnects (e.g., MOL contacts and BEOL wiring) to facilitate communication between the monitor 100 and the processor 90 and, particularly, to enable the electric signals output from the photodetectors $150_1$-$150_n$ of the monitor 100 to be communicated to the processor 90. The communication network 195 in a multi-chip structure can include on-chip interconnects (e.g., MOL contacts and BEOL wiring) on each chip and either direct chip-to-chip interconnects or indirect chip-to-chip interconnects (e.g., via the chip carrier or package) to facilitate communication between the monitor 100 and the processor 90 and, particularly, to enable the electric signals output from the photodetectors $150_1$-$150_n$ of the monitor 100 to be communicated to the processor 90. The communication network 195 in a monitoring system that employs a remote computing device can include on-chip interconnects (e.g., MOL contacts and BEOL wiring) as well as wireless communication devices to facilitate communication between the monitor 100 and the processor 90 in the remote computing device and, particularly, to enable the electric signals output from the photodetectors $150_1$-$150_n$ of the monitor 100 to be communicated to the processor 90. Communication networks as described above for intra-chip communications, for chip-to-chip communications in a multi-chip structure, and wireless chip to computerized device communications are well known in the art and, thus, the details thereof have been omitted from this specification to allow the reader to focus on the salient aspects of the disclosed embodiments.

The processor 90 can receive, via the communication network 195, the electric signals output from the photodetectors $150_1$-$150_n$ of the monitor 100 (from one or both sides of the end portion 31 of the waveguide core 30) and, if applicable, the additional electric signal output from the additional photodetector 170 coupled to the tap off the waveguide core 30. The processor 90 can monitor (i.e., can be adapted to monitor, can be configured to monitor, can execute a program of instructions to monitor, etc.) the received signals from the monitor 100 and can further perform (i.e., can be adapted to perform, can be configured to perform, can execute a program of instructions to perform, etc.) an assessment of the optical interface 35 and, particularly, the health or performance of the optical interface 35 using the electric signals output from the photodetectors $150_1$-$150_n$ of the monitor 100 (from one or both sides of the end portion 31 of the waveguide core 30) and, if applicable, also using the additional electric signal output from the additional photodetector 170. That is, the electric signals from the photodetectors of the monitor can be monitored and, if applicable, the additional electric signal from the additional photodetector of the monitor can also be monitored. Then, based on any changes exhibited in the electric signals and/or any changes exhibited in the additional electric signal, certain inferences can be made about the health of the optical interface 35 potentially including, but not limited to, inferences about the health of the source of the light signals and/or about the health of the coupling mechanism.

For example, consider the structure shown in FIGS. 5A-1 to 5A-3, if a reduction in laser power is indicated by changes in the electric signals from the photodetectors $150_1$-$150_n$ and also indicated by a corresponding change in the additional electric signal from the additional photodetector 170, then it can be inferred that the laser 501 has degraded. However, if a reduction in power is indicated by a change in the additional electric signal from an additional photodetector 170, but the electric signals output from at least some of the photodetectors still indicate full or high power, then it can be inferred that the laser 501 has not degraded but instead there is a problem with the coupling mechanism.

Optionally, the processor 90 can generate and output (e.g., via an output device) a report or notification indicating the results of the assessment. Such a report or notification can be output on-demand, periodically, or conditionally (e.g., when the light source has degraded below some threshold, when some other performance threshold is not met, etc.). Monitoring system mechanisms for generating and outputting reports or notifications regarding system performance, health or reliability are well known in the art and, thus, the details thereof have been omitted from this specification to allow the reader to focus on the salient aspects of the disclosed embodiments.

It should be noted that in the above-described PIC chip structure 190 and monitoring system 10A-10D, the monitor 100 and, particularly, the photodetectors therein are employed for monitoring purposes only and not in communication with other devices on the PIC chip structure 190 (e.g., not in communication with devices in the functional circuit block 40)

Figure 7:
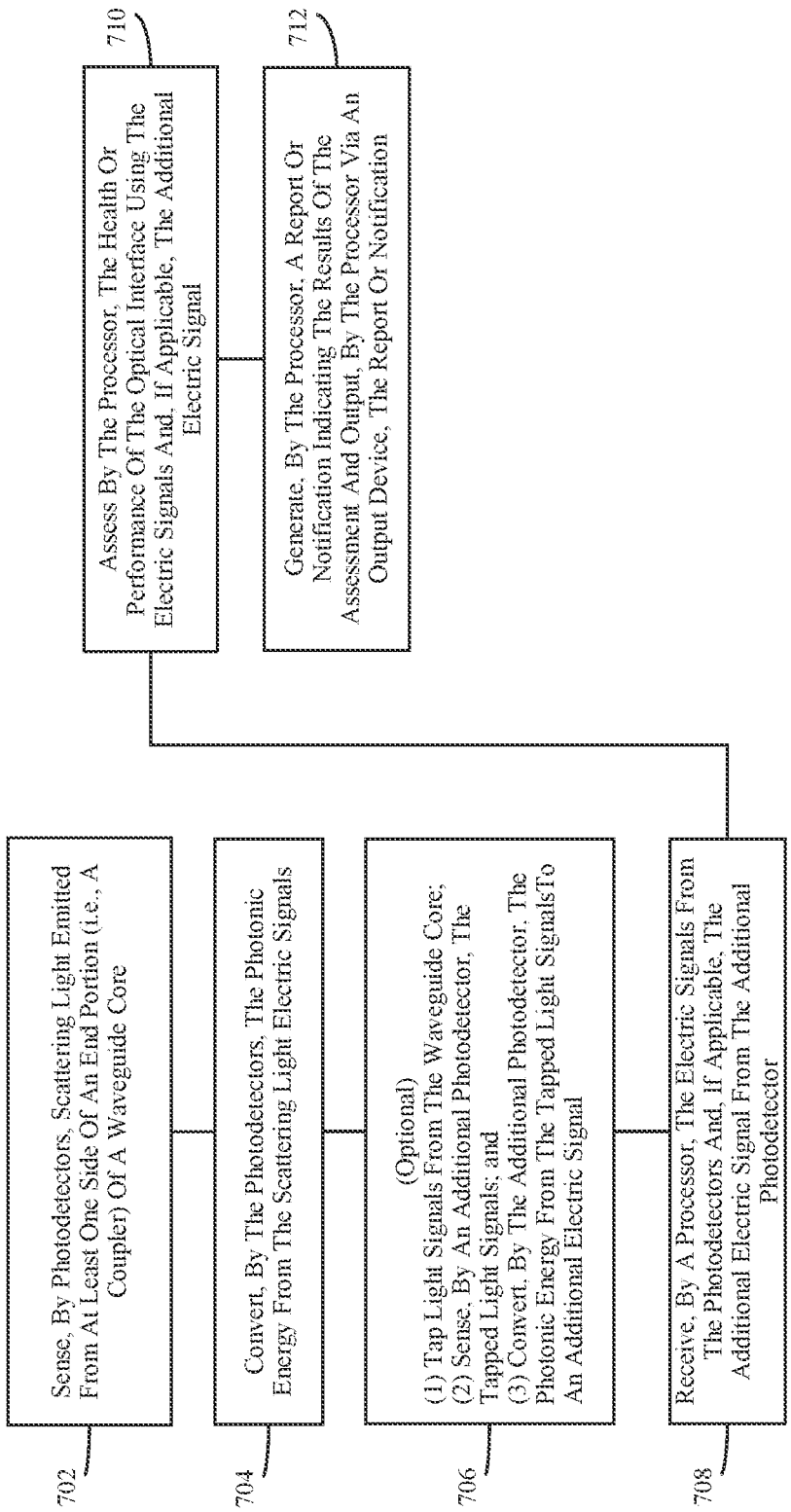
FIG. 7 is a flow diagram illustrating a disclosed monitoring method.

Referring to the flow diagram of FIG. 7, also disclosed herein are associated monitoring method. Referring to FIG. 7 in combination with any of the monitoring systems 10A-10D shown in FIGS. 1A-1D, the method can include, when an end portion 31 (i.e., a coupler) of a waveguide core 30 on a PIC chip structure 190 receives, at an optical interface 35, light signals 21 (e.g., from an optical device 20 for propagation to the main body of the waveguide core 30 or from the main body of the waveguide core 30 for transmission to an optical device 20), sensing, by photodetectors $150_1$-$150_n$ of an on-chip monitor 100, scattering light emitted from at least one side of the end portion 31 of the waveguide core 30 (see process 702).

The method can further include converting, by the photodetectors $150_1$-$150_n$, photonic energy from the sensed scattering light to electric current and, thereby to electric signals (see process 704).

Optionally in cases where light signals are received by the end portion 31 from the optical device for propagation to the main body of the waveguide core 30, the method can include tapping a portion of the light signals 21 from the waveguide core 30, sensing, by an additional photodetector 170, the tapped portion of the light signals, and converting, by the additional photodetector 170, photonic energy from the tapped portion of the light signals to electric current and, thereby to an additional electric signal (see process 706).

The method can further include receiving, by a processor 90 via a communication network 195, the electric signals from the photodetectors $150_1$-$150_n$ and, if applicable, the additional electric signal from the additional photodetector 170 (see process 708). The method can include monitoring, by the processor 90, the electric signals from the photodetectors $150_1$-$150_n$ and, if applicable, the additional electric signal from the additional photodetector 170. Based on any changes exhibited in the electric signals and/or any changes exhibited in the additional electric signal, certain inferences can be made about the health of the optical interface 35 potentially including, but not limited to, the health of the source of the light signals and/or the health of the coupling mechanism. Specifically, the method can further include assessing, by the processor 90, the optical interface 35 (e.g., the health or performance of the optical interface) using the electric signals from the photodetectors $150_1$-$150_n$ and, if applicable, using the additional electric signal from the additional photodetector 170 (see process 710). This assessment can, more specifically, be based on any noted changes in the electric signals from the photodetectors $150_1$-$150_n$ and, if applicable, any noted changes in the additional electric signal from the additional photodetector 170.

The method can further include, generating, by the processor 90, a report or notification indicating the results of the assessment and further outputting, by the processor 90 via an output device, the report or notification (see process 712).

It should be understood that in the structures and methods described above, a semiconductor material refers to a material whose conducting properties can be altered by doping with an impurity. Exemplary semiconductor materials include, for example, silicon-based semiconductor materials (e.g., silicon, silicon germanium, germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region. Furthermore, when a semiconductor region or layer is described as being at a higher conductivity level than another semiconductor region or layer, it is more conductive (less resistive) than the other semiconductor region or layer; whereas, when a semiconductor region or layer is described as being at a lower conductivity level than another semiconductor region or layer, it is less conductive (more resistive) than that other semiconductor region or layer.

As discussed above aspects of the present disclosure are computer-implemented and can include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
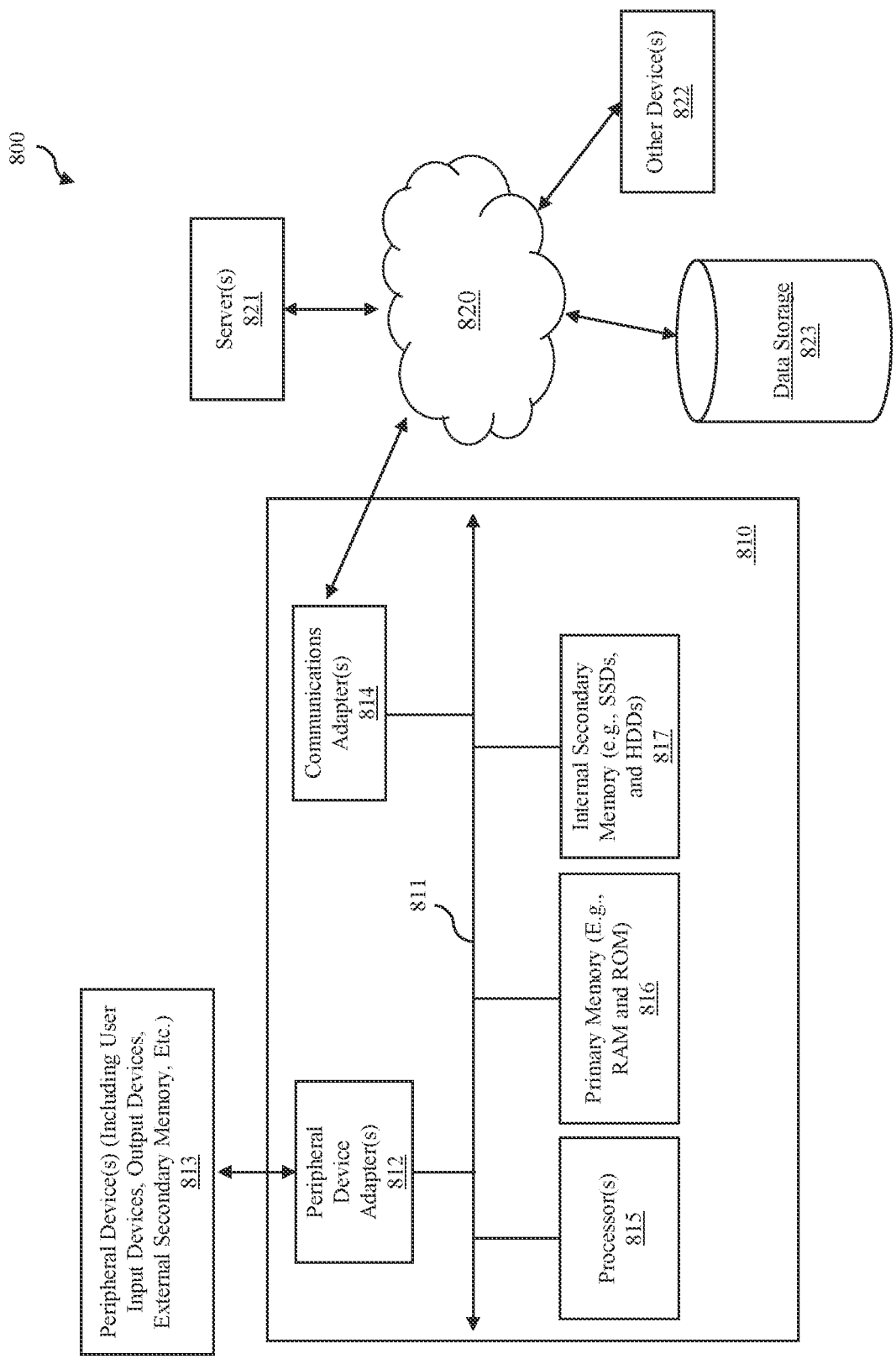
FIG. 8 is a schematic diagram showing an illustrative hardware environment for implementing aspects of the disclosed systems and methods.

An exemplary hardware environment 800 for implementing aspects of the disclosed systems, methods and computer program products is depicted in FIG. 8. Generally, the hardware environment can include at least one computing device 810 (also referred to herein as a computer). The computer 810 can be, for example, a desktop, laptop, tablet, mobile computing device, smart phone, etc. The computer 810 can include at least one bus 811. The bus 811 can be connected to various other components of the computer 10 and can be configured to facilitate communication between those components.

The computer 810 can include various adapters. The adapters can include one or more peripheral device adapters 812, which are configured to facilitate communications between one or more peripheral devices 813, respectively, and the bus 811. The peripheral devices 813 can include user input devices configured to receive user inputs. User input devices can include, but are not limited to, a keyboard, a mouse, a microphone, a touchpad, a touchscreen, a stylus, bio-sensor, a scanner, or any other type of user input device. The peripheral devices 813 can also include additional input devices, such as external secondary memory devices (as discussed in greater detail below). The peripheral devices 813 can also include output devices. The output devices can include, but are not limited to, a printer, a monitor, a speaker, or any other type of computer output device. The adapters can include one or more communications adapters 814 (also referred to herein as a computer network adapters), which are configured to facilitate communications between the computer 810 and one or more communication networks 820 (e.g., a wide area network (WAN), a local area network (LAN), the Internet, a cellular network, a wifi network, etc.). Such network(s) 820 can, in turn, facilitate communications between the computer 10 and other system components on the network: remote server(s) 821, other device(s) 822 (e.g., computers, laptops, tablets, mobile phones, etc.), remote data storage 823, etc.

The computer 810 can further include at least one processor 815 (also referred to herein as a central processing units (CPU)). Optionally, each CPU 815 can include a CPU cache. Each CPU 815 can be configured to read and execute program instructions.

The computer 810 can further include memory and, particularly, computer-readable storage mediums. The memory can include primary memory 816 and secondary memory. The primary memory 816 can include, but is not limited to, random access memory (RAM) (e.g., volatile memory employed during execution of program operations) and read only memory (ROM) (e.g., non-volatile memory employed during start-up). The RAM can include, but is not limited to, dynamic random-access memory (DRAM), static random access memory (SRAM), or any other suitable type of RAM. The ROM can include, but is not limited to, erasable programmable read only memory (EPROM), flash memory, electronically erasable programmable read only memory (EEPROM), programmable read only memory (PROM), or any other suitable type of ROM. The secondary memory can be non-volatile. The secondary memory can include internal secondary memory 817, such as internal solid state drive(s) (SSD(s)) and/or internal hard disk drive(s) (HDD(s)), installed within the computer 810 and connected to the bus 811. The secondary memory can also include external secondary memory connected to or otherwise in communication with the computer 810 (e.g., peripheral devices). The external secondary memory can include, for example, external/portable SSD(s), external/portable HDD(s), flash drive(s), thumb drives, compact disc(s) (CD(s)), digital video disc(s) (DVD(s)), network-attached storage (NAS), storage area network (SAN), or any other suitable non-transitory computer-readable storage media connected to or otherwise in communication with the computer 810. The different functions of primary and secondary memory are well known in the art and, thus, the details thereof have been omitted from this specification to allow the reader to focus on the salient aspects of the disclosed embodiments.

In some embodiments, program instructions for performing the disclosed method or a portion thereof, as described above, can be embodied in (e.g., stored in) secondary memory accessible by the computer 810. When the program instructions are to be executed (e.g., in response to user inputs to the computer 810), required information (e.g., the program instructions and other data) can be loaded into the primary memory (e.g., stored in RAM). The CPU 815 can read the program instructions and other data from the RAM and can execute the program instructions. In other embodiments, a client-server model can be employed. In this case, the computer 810 can be a client and a remote server 821 in communication with the computer 810 over a network 820 can provide, to the client, a service including execution of program instructions for performing the disclosed method or a portion thereof, as described above, in response to user inputs the computer 810.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises", "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). Additionally, the term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
  a waveguide core having an end portion with opposing sides;
  photodetectors adjacent to at least one side of the end portion; and
  at least one collector region between the end portion and a group of the photodetectors,
  wherein each collector region includes a collector body having a first sidewall adjacent to the end portion and a second sidewall opposite the first sidewall and adjacent to each of the photodetectors in the group.

2. The structure of claim 1,
  wherein the end portion receives light signals, and
  wherein the photodetectors sense scattering light emitted from the end portion.

3. The structure of claim 1,
  wherein each photodetector comprises a photodiode with an absorption region positioned laterally between a P-type semiconductor region and an N-type semiconductor region,
  wherein the first sidewall has a first length and the second sidewall has a second length that is shorter than the first length,
  wherein each collector region further includes collector extensions, and
  wherein each collector extension extends from the collector body toward the absorption region of a corresponding photodiode.

4. The structure of claim 1,
  wherein each photodetector comprises a photodiode with an absorption region positioned laterally between a P-type semiconductor region and an N-type semiconductor region,
  wherein the photodetectors comprise a first group on a first side of the end portion and a second group on a second side of the end portion, wherein the structure further comprises two collector regions comprising:
  a first collector region between the first group and the end portion; and
  a second collector region between the second group and the end portion, and
wherein, in each collector region, the first sidewall has a first length and the second sidewall has a second length that is shorter than the first length,
wherein each collector region further includes collector extensions, and
wherein each collector extension extends from the collector body toward the absorption region of a corresponding photodiode.

5. The structure of claim 1, wherein the photodetectors have discrete outputs.

6. The structure of claim 1, wherein at least two of the photodetectors are series-connected with a combined output.

7. The structure of claim 1, wherein the photodetectors comprise any of PIN photodiodes and avalanche photodiodes.

8. The structure of claim 1,
wherein the end portion is at an optical interface with an optical device,
wherein the end portion receives light signals from one of the optical device for propagation to a main body of the waveguide core and the main body for transmission to the optical device.

9. The structure of claim 8,
wherein the optical device comprises a light source comprising any of an optic fiber, a laser, and a second waveguide core,
wherein the end portion receives the light signals from the light source for propagation to the main body, and
wherein the structure further comprises:
  an additional waveguide core tapping off the waveguide core; and
  an additional photodetector coupled to the additional waveguide core.

10. The structure of claim 1, wherein the waveguide core comprises any of a silicon waveguide core, a silicon nitride waveguide core, a silicon oxynitride waveguide core and an aluminum nitride waveguide core.

* * * * *